US006443490B2

(12) United States Patent
Webb

(10) Patent No.: US 6,443,490 B2
(45) Date of Patent: Sep. 3, 2002

(54) DUAL MODE STABILIZER FOR BACKHOE LOADERS AND BACKHOE ATTACHMENTS

(75) Inventor: Sterling E. Webb, Knoxville, TN (US)

(73) Assignee: William E. Webb, Knoxville, TN (US)

( * ) Notice: Subject to any disclaimer, the term of this patent is extended or adjusted under 35 U.S.C. 154(b) by 0 days.

(21) Appl. No.: 09/758,771

(22) Filed: Jan. 11, 2001

Related U.S. Application Data

(63) Continuation-in-part of application No. 09/503,690, filed on Feb. 14, 2000, now abandoned, which is a continuation-in-part of application No. 09/096,549, filed on Jun. 12, 1998, now Pat. No. 6,076,855.

(51) Int. Cl.[7] .............................. B60S 9/10; B60S 9/22
(52) U.S. Cl. .................................... 280/765.1; 212/305
(58) Field of Search ............................ 280/762, 763.1, 280/764.1, 765.1, 766.1; 212/301, 302, 303, 304, 305, 306; 254/418, 423

(56) References Cited

U.S. PATENT DOCUMENTS

| | | | | |
|---|---|---|---|---|
| 3,362,683 A | * | 1/1968 | Hansen | 254/423 |
| 3,734,531 A | | 5/1973 | Metaillier | |
| 3,918,741 A | | 11/1975 | Olson et al. | |
| 4,118,054 A | | 10/1978 | Vigerie | |
| 4,288,196 A | | 9/1981 | Sutton, II | |
| 4,607,862 A | * | 8/1986 | Deram et al. | 280/765.1 |
| 4,619,369 A | | 10/1986 | Mertens | |
| 4,635,412 A | | 1/1987 | Le Poittevin | |
| 4,889,357 A | | 12/1989 | Perry | |
| 5,171,124 A | | 12/1992 | Foster | |
| 5,277,465 A | * | 1/1994 | Weir | 280/762 |
| 5,387,071 A | | 2/1995 | Pinkston | |
| 5,401,046 A | | 3/1995 | Schwartz et al. | |
| 5,431,443 A | | 7/1995 | Skoff | |
| 5,451,080 A | | 9/1995 | Kneile | |
| 5,542,647 A | | 8/1996 | Huetsch | |
| 5,575,492 A | | 11/1996 | Stone | |
| 5,575,493 A | | 11/1996 | Schwartz et al. | |
| 5,622,235 A | | 4/1997 | Merrit | |
| 5,899,496 A | | 5/1999 | Muraro | |
| 5,901,980 A | | 5/1999 | Few et al. | |
| 6,089,603 A | * | 7/2000 | Ackley | 280/765.1 |

FOREIGN PATENT DOCUMENTS

| | | | | |
|---|---|---|---|---|
| DE | 869011 | | 3/1953 | 280/765.1 |
| EP | 0 457 341 A1 | * | 11/1991 | 280/763.1 |
| FR | 1514814 | * | 2/1968 | 280/763.1 |
| JP | 1-202559 | | 8/1989 | 280/765.1 |

OTHER PUBLICATIONS

Melroe Company: Bobcat Backhoes—Backhoe Attachments Catalog (Date Unknown).

JCB, Inc.: JCB 214 and 214S Series 2 Backhoe Loaders, Catalog (Date uncertain, possibly “9/96”).

JCB Inc.: Backhoe Loaders—Product Specifications, Sep. 1997, Catalog.

* cited by examiner

*Primary Examiner*—Frank Vanaman
(74) *Attorney, Agent, or Firm*—Pitts & Brittian, P.C.

(57) ABSTRACT

A dual mode stabilizer for primary use in conjunction with a backhoe loader or in conjunction with a backhoe attachment for a skid steer loader. The dual mode stabilizer includes a pair of base members rigidly fixable on opposite sides of the tractor proximate the backhoe. A stabilizer arm assembly engages the base member. The stabilizer arm assembly is piston actuated and includes an outrigger arm member, a sliding arm member pivotally connected to the outrigger arm member so as to limit movement of the outrigger arm member with respect to the sliding arm member to rotational movement about a first pivot point, a first locking mechanism for preventing rotational movement of the outrigger arm member. Movement of the sliding arm member within the base member is limited to axial movement. A second locking mechanism is provided between the base member and the sliding arm member to prevent axial movement of the sliding arm member within the base member.

11 Claims, 26 Drawing Sheets

DUAL MODE STABILIZER FOR BACKHOE LOADERS AND BACKHOE ATTACHMENTS

This continuation-in-part application discloses and claims subject matter disclosed in my earlier filed application Ser. No. 09/503,690, filed on Feb. 14, 2000, abandoned, which in turn is a continuation-in-part of my earlier filed application Ser. No. 09/096,549, filed on Jun. 12, 1998, now U.S. Pat. No. 6,076,855.

TECHNICAL FIELD

This invention relates to the field of industrial equipment. More particularly, it relates to a stabilizer for use in conjunction with industrial equipment that requires a stabilizer such as a rubber tired backhoe loader, a crane or a backhoe attachment mounted on, for instance, a skid steer loader.

BACKGROUND ART

It is known in the art to use stabilizers with a piece of industrial equipment that has a narrow wheel base and a high, and often shifting, center of gravity. For instance, rubber tired backhoe loaders typically utilize stabilizers. Generally, there are two main configurations for stabilizers; fold-down pivoting stabilizers, also known as outriggers, and vertical stabilizers which are useful for working in tight areas. In addition, skid steer loaders are frequently used for light industrial applications, frequently involving the use of a backhoe attachment for trenching and for light duty excavation. It is known in the art that a backhoe attachment includes either a vertical stabilizer or a fold down stabilizer, but not both. Heretofore, an operator had to choose what type of attachment was needed. If, for instance, a tractor has a state of the art fold-down stabilizer installed, but the work area is too narrow and demands a vertical stabilizer, or if a tractor has a vertical stabilizer, but has to dig a trench on a sloped area, the operator must decide whether to use a different piece of equipment or attempt to use equipment ill-suited for the task. This results in increased costs of operation and lost time due to the change in equipment.

There are several known art references that teach either vertical type supports or stabilizers for various types of equipment or fold-down pivoting stabilizers.

| Patent No. | Inventor(s) | Issue Date |
|---|---|---|
| 5,901,980 | Few et al. | May 11, 1999 |
| 5,899,496 | Muraro | May 4, 1999 |
| 5,622,235 | Merritt | Apr. 22, 1997 |
| 5,575,493 | Schwartz et al. | Nov. 19, 1996 |
| 5,575,492 | Stone | Nov. 19, 1996 |
| 5,451,080 | Kneile | Sep. 19, 1995 |
| 5,431,443 | Skoff | Jul. 11, 1995 |
| 5,401,046 | Schwartz et al. | Mar. 28, 1995 |
| 5,387,071 | Pinkston | Feb. 7, 1995 |
| 5,171,124 | Foster | Dec. 15, 1992 |
| 4,635,412 | Le Poittevin | Jan. 13, 1987 |
| 4,619,369 | Mertens | Oct. 28, 1986 |
| 4,288,196 | Sutton | Sep. 8, 1981 |
| 4,118,054 | Vigerie | Oct. 3, 1978 |
| 3,918,741 | Olson, et al. | Nov. 11, 1975 |
| 3,734,531 | Metaillier | May 22, 1973 |

What has heretofore been missing from the art is a stabilizer that uses a standard hydraulic system and that is readily operable in either a vertical stabilizer mode or in a fold-down stabilizer mode.

Accordingly, it is an object of the present invention to provide a dual mode stabilizer, operable in either a fold-down stabilizer mode or a vertical stabilizer mode.

A further object of the present invention is to provide a dual mode stabilizer that is operable with a standard hydraulic system without requiring an additional hydraulic ram for each mode.

Yet another object of the present invention is to provide a dual mode stabilizer which is readily switchable from one mode to another while the equipment is in use.

Still another object of the present invention is to provide a dual mode stabilizer having adjustable mounting brackets.

Other objects and advantages over the prior art will become apparent to those skilled in the art upon reading the detailed description together with the drawings as described as follows.

DISCLOSURE OF THE INVENTION

In accordance with the various features of this invention, a dual mode stabilizer for a rubber tired backhoe loader and for a backhoe attachment for a skid steer loader, is provided. As used herein, tractor will refer to either a backhoe loader, including without limitation rubber tired backhoe loaders, or a skid steer loader. Those skilled in the art will recognize that the dual mode stabilizer of the present invention has utility with any type of industrial equipment that requires a stabilizer. The dual mode stabilizer can either be mounted directly on the frame of the tractor or on the backhoe attachment. Accordingly, reference herein to mounting or positioning relative to the backhoe attachment will be understood to be inclusive of mounting directly to the frame. Further, those skilled in the art will recognize that a dual-mode stabilizer can be mounted at each corner of the tractor. The dual mode stabilizer includes at least one base member rigidly fixed proximate at least one corner of the tractor proximate the backhoe. Each base member defines a channel for receiving a stabilizer arm assembly and includes a first anchor point disposed proximate the top of the base member and a stop disposed proximate the lower end of the base member. A stabilizer arm assembly is nested within and received by the base member. The stabilizer arm assembly includes a piston for actuating the stabilizer arm assembly, an outrigger arm member, a sliding arm member pivotally connected to the outrigger arm member so as to limit movement of the outrigger arm member with respect to the sliding arm member to rotational movement about a first pivot point proximate the lower end of the outrigger arm member and a first locking mechanism for preventing rotational movement of the outrigger arm member. A pin provided at the first pivot point engages the stop to limit the upward range of axial movement of the stabilizer arm assembly within the base member. In the preferred embodiment, the stop is defined by a clevis that receives the pin. Preferably, a bushing, engaged with the pin, engages the clevis so as to distribute the pressure at the point of contact over a greater surface area. Additionally, a brace is provided to reinforce the lower end of the base member proximate the clevis. The piston has a first end secured to the first anchor point and a second end secured to a second anchor point provided on the outrigger arm member.

The sliding arm member engages the base member and an associated mechanism is provided to limit movement of the sliding arm member within the base member to axial movement. A second locking mechanism is provided between the base member and the sliding arm member to prevent axial movement of the sliding arm member within the base member.

Actuation of the piston with the first locking mechanism engaged, preventing rotational movement of the outrigger arm, and the second locking mechanism released causes the stabilizer arm assembly to travel downwardly within base member thus providing operation in the vertical stabilizer mode. Contrariwise, actuation of the piston with the first locking mechanism released and the second locking mechanism engaged, preventing axial movement of the sliding arm member, causes the outrigger arm member to rotate about the first pivot point thereby providing operation in the fold down stabilizer mode. In the preferred embodiment, a foot member is provided at the distal end of each of the outrigger arm member and the sliding arm member.

BEST MODE FOR CARRYING OUT THE INVENTION

Figure 11:
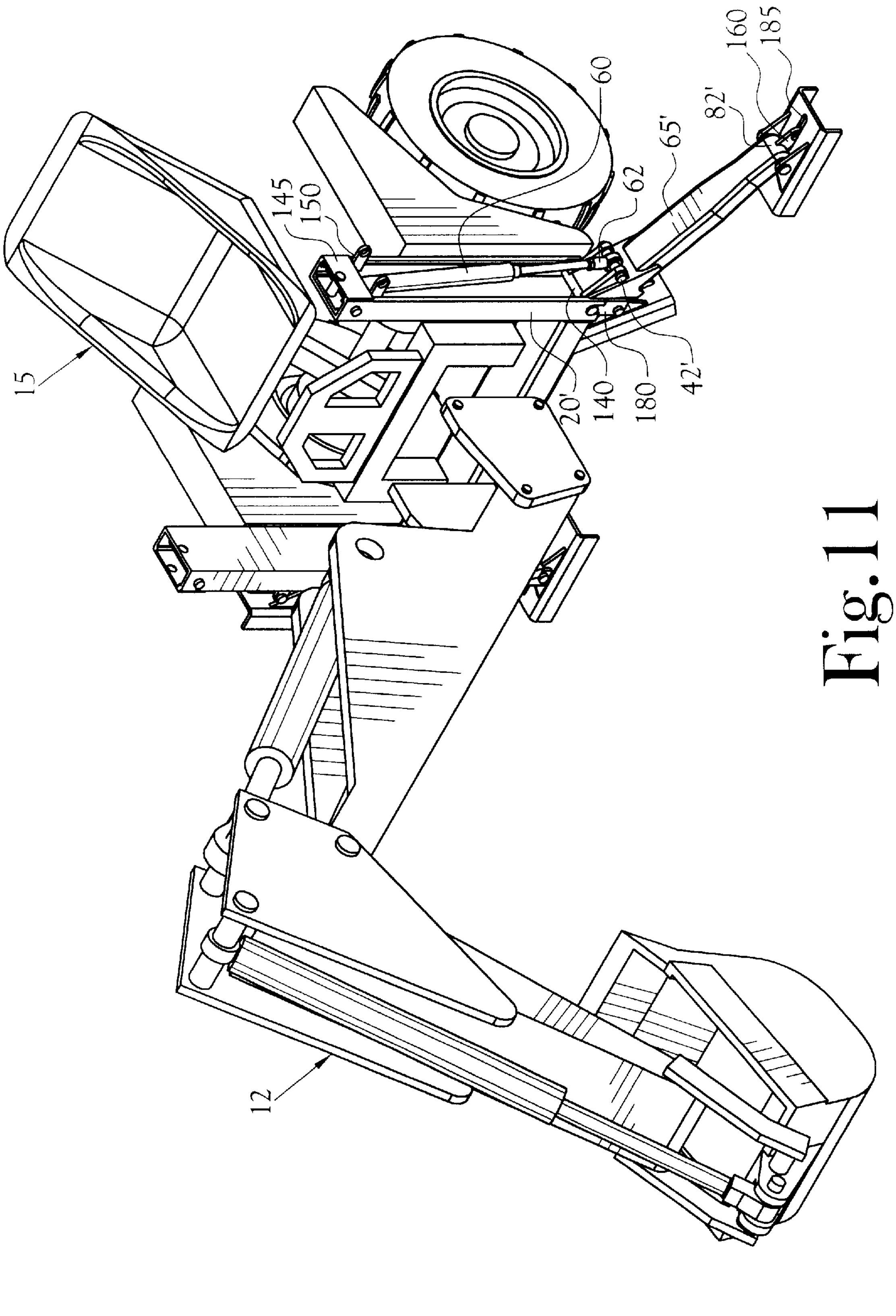
FIG. 11 illustrates a partial perspective view of the embodiment illustrated in FIG. 8 mounted on a tractor.
Figure 15:
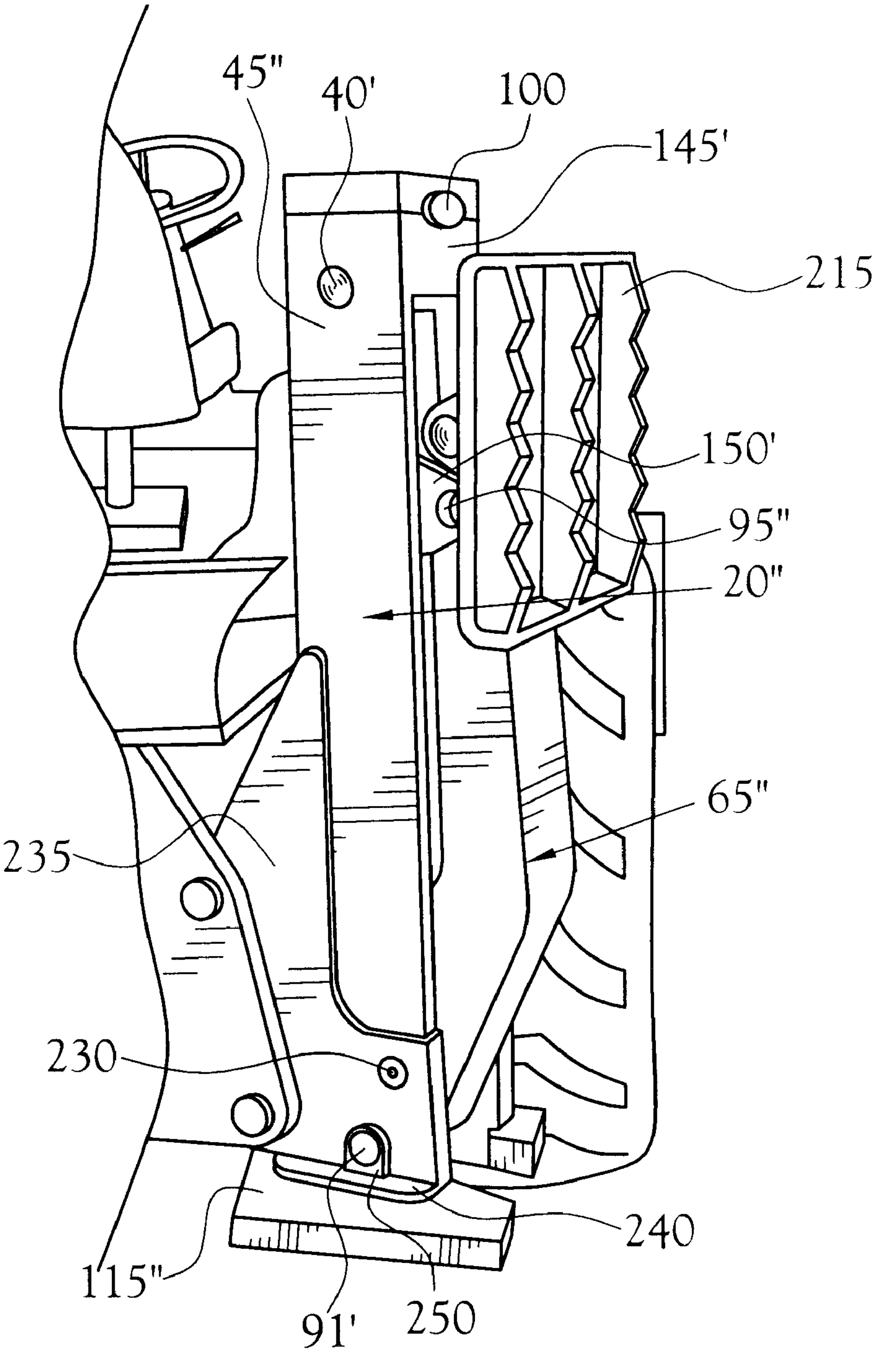
FIG. 15 illustrates a partial perspective view showing the embodiment illustrated in FIG. 12 mounted on a rubber-tire backhoe loader.
Figure 16:
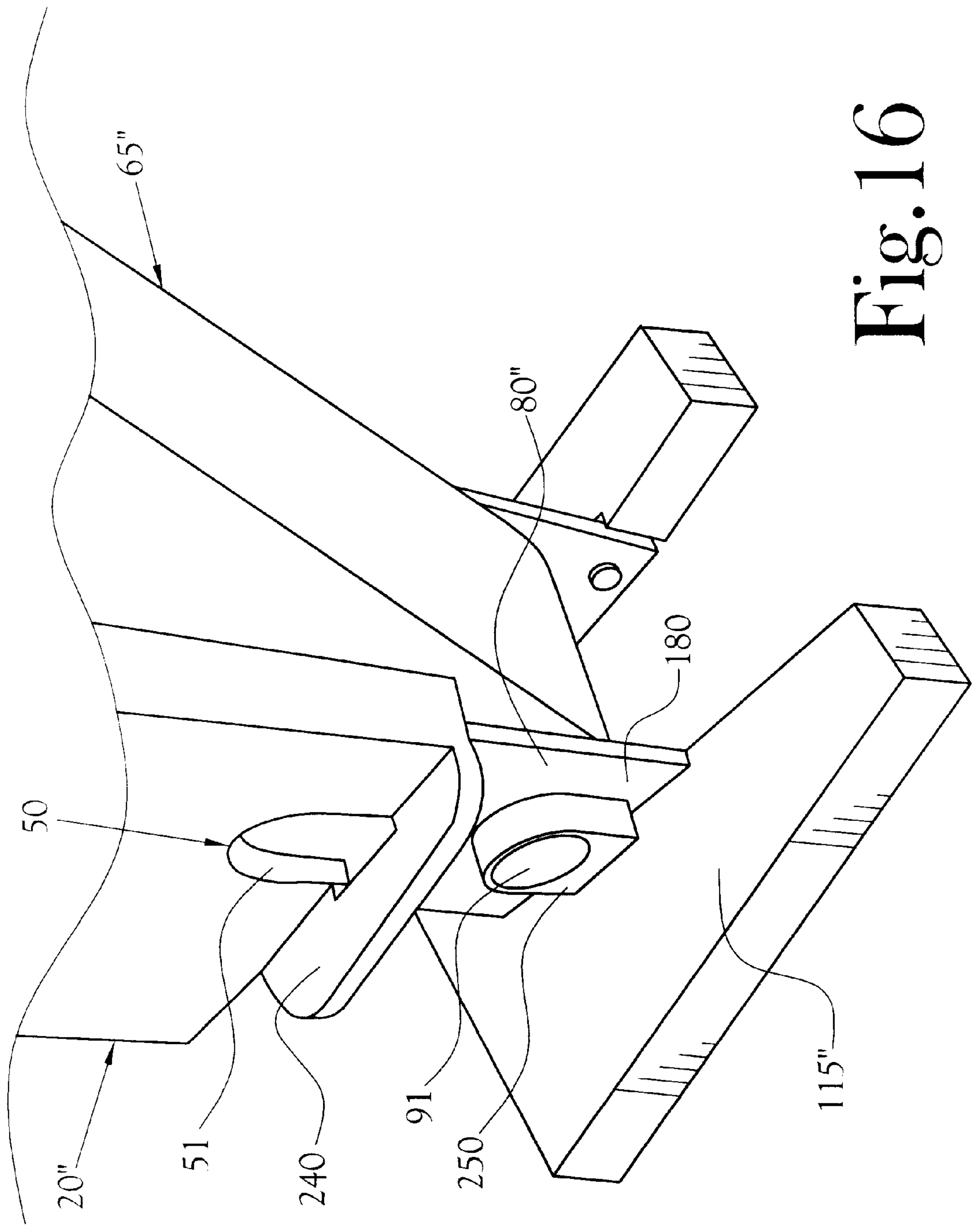
FIG. 16 illustrates a partial perspective view of the sliding am member deployed in the vertical stabilizer mode.
Figure 17:
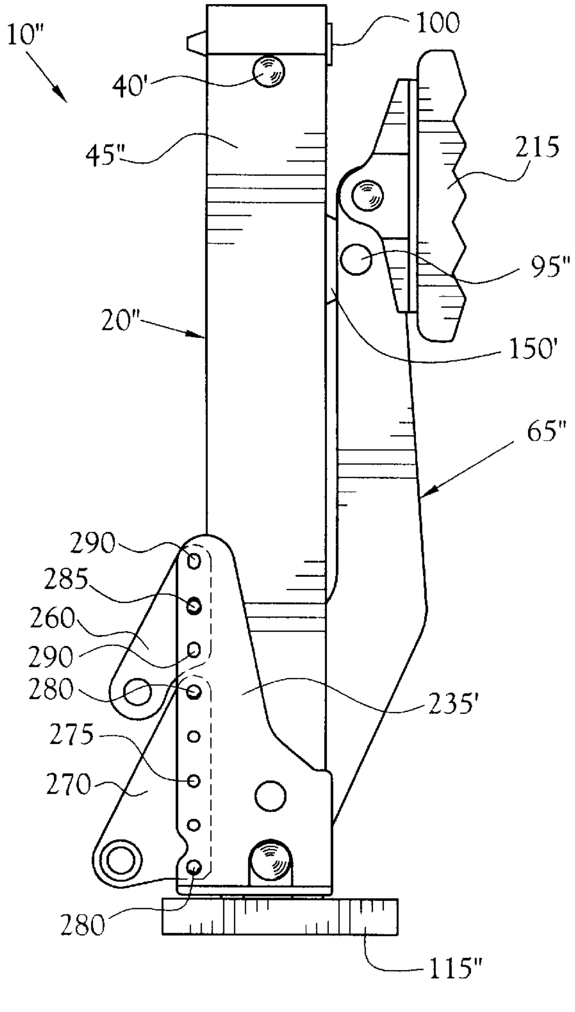
FIG. 17 illustrates a side elevation view of a third alternate embodiment of the dual mode stabilizer having adjustable mounting brackets configured for mounting on a state of the art rubber-tire backhoe loader, with certain mounting bolts removed for clarity of view.
Figure 18:
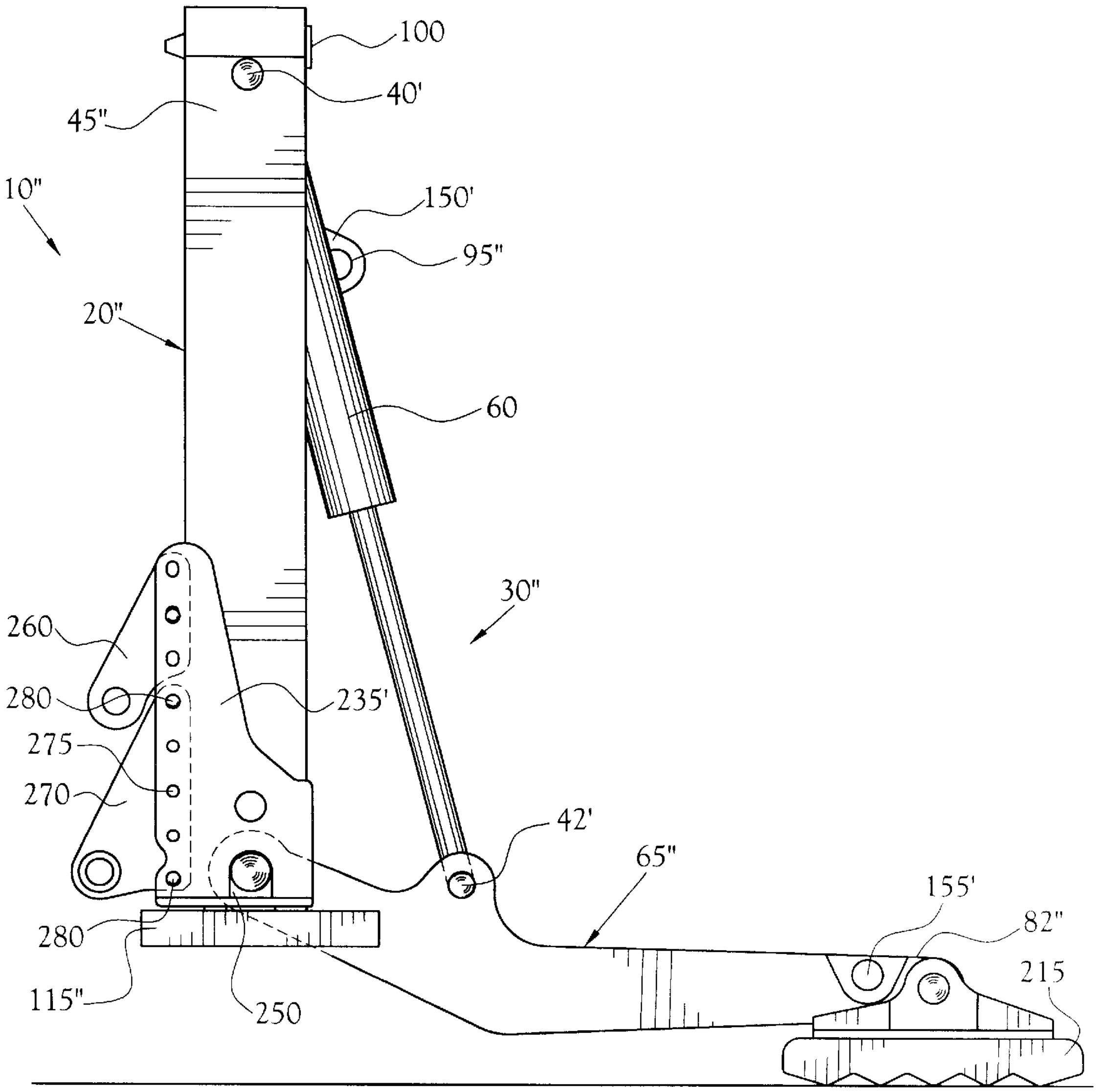
FIG. 18 illustrates a side elevation view of the embodiment shown in FIG. 17 operating in the fold down stabilizer mode.
Figure 19:
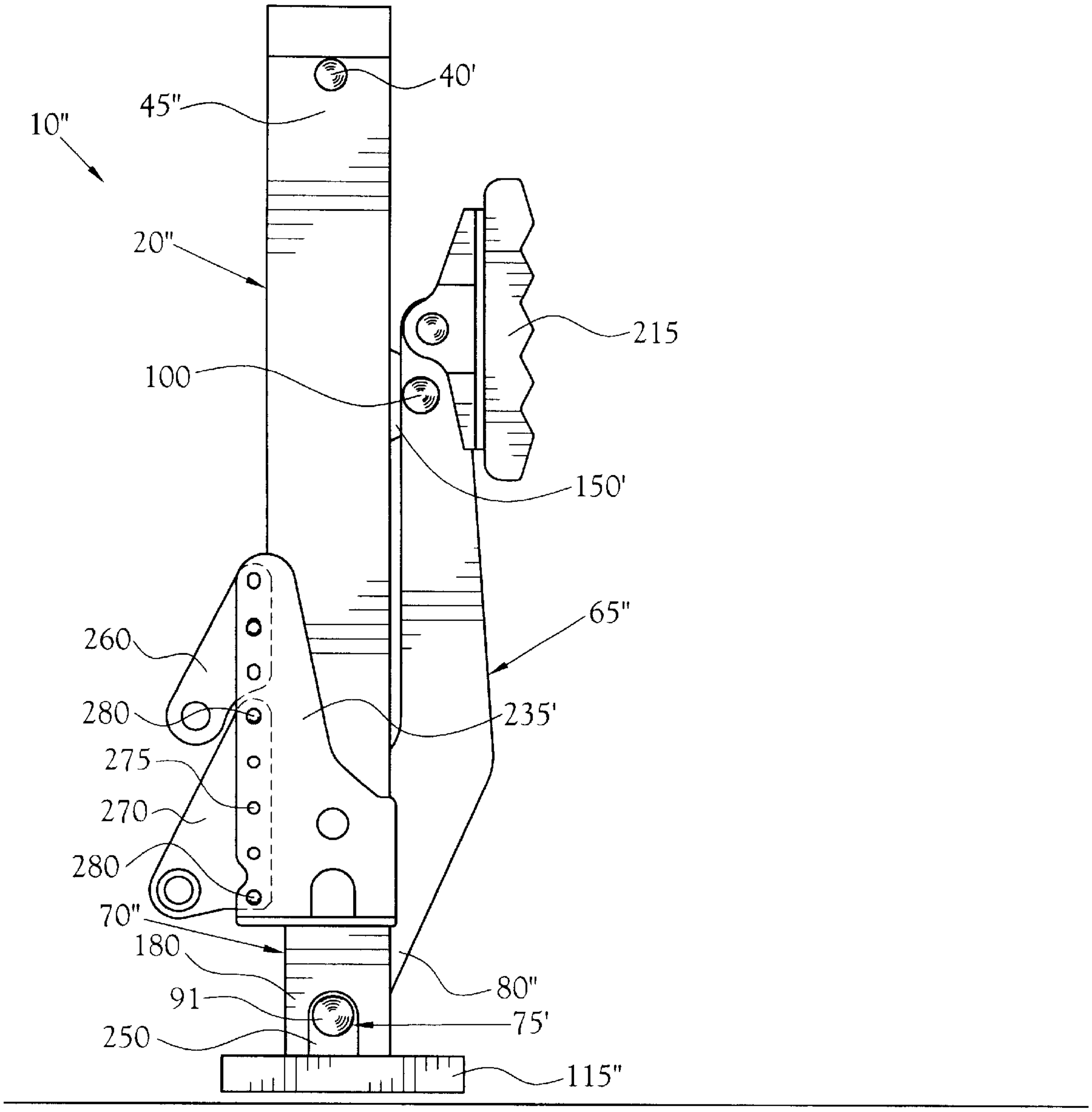
FIG. 19 illustrates a side elevation view of the embodiment shown in FIG. 17 operating in the vertical stabilizer mode.
Figure 20:
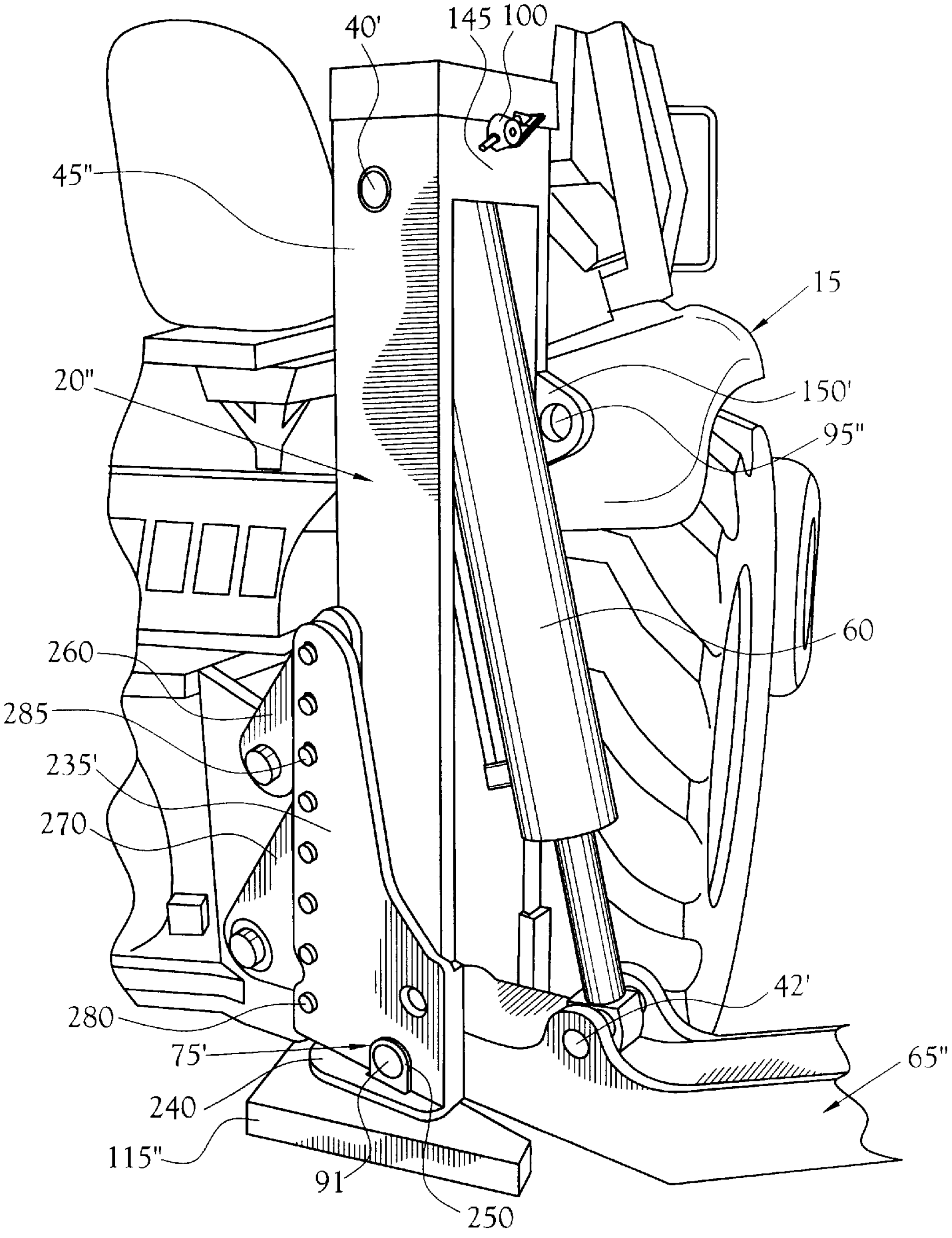
FIG. 20 illustrates a partial perspective view showing the embodiment illustrated in FIG. 17 mounted on a rubber-tire backhoe loader.
Figure 21:
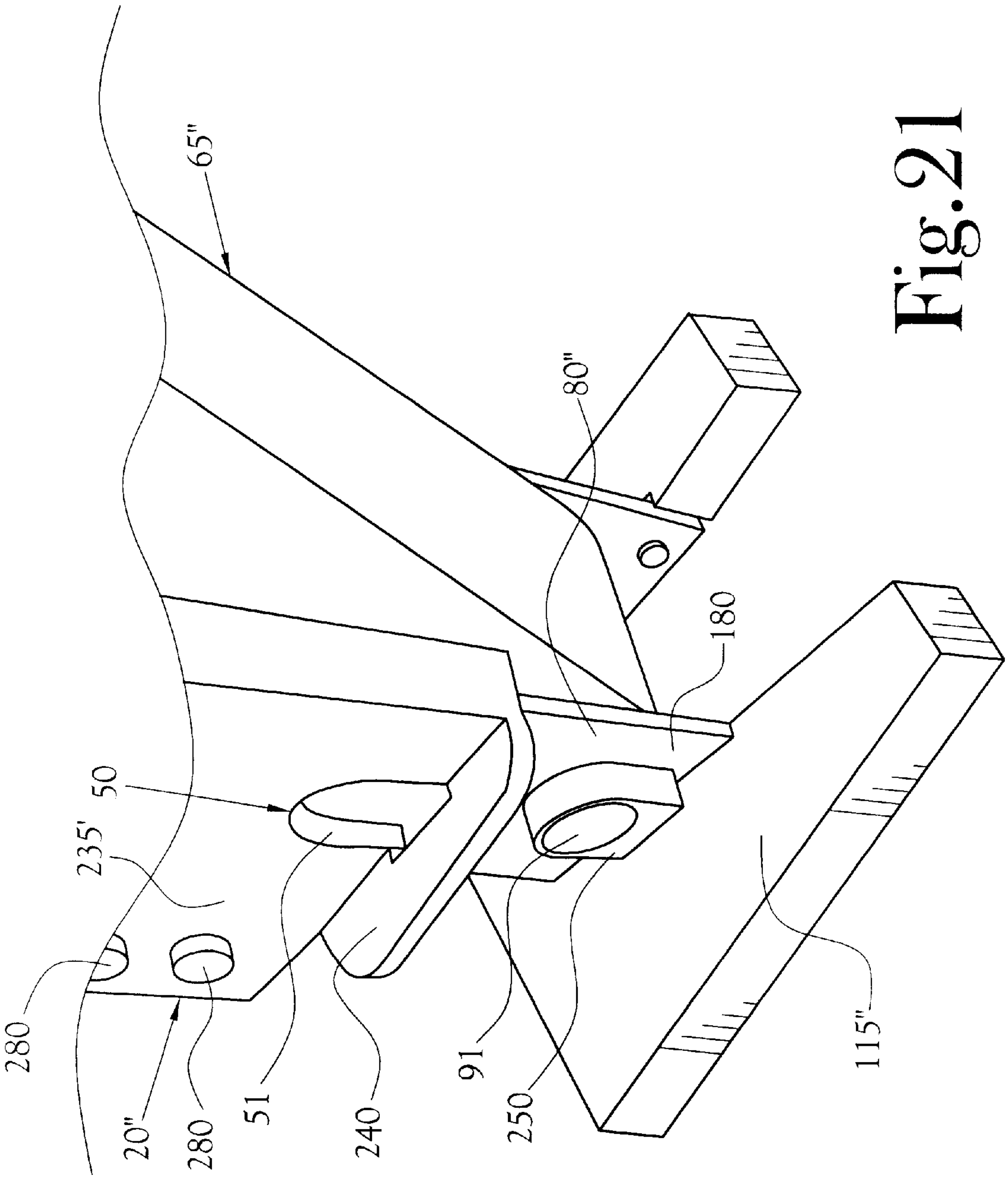
FIG. 21 illustrates a partial perspective view of the embodiment illustrated in FIG. 17 showing the sliding am member deployed in the vertical stabilizer mode.

A dual mode stabilizer, constructed in accordance with the present invention, is illustrated generally as 10 in the figures. Dual mode stabilizer 10 is primarily used in conjunction with a backhoe loader, including without limitation a rubber-tired backhoe loader, and can also be used in conjunction with a backhoe attachment for a skid steer loader. As used herein, tractor will refer to either a backhoe loader such as a rubber-tired backhoe loader or a skid steer loader. A tractor is illustrated generally as 15 in the figures. The dual mode stabilizer 10 includes a pair of base members 20 rigidly fixed on opposite sides of the tractor 15 proximate the backhoe attachment. Those skilled in the art will recognize that the dual mode stabilizer 10 can either be mounted directly on the frame of the tractor 15, as illustrated in FIG. 15, or on a backhoe attachment, as illustrated in FIG. 11. Each base member 20 defines a channel 25 for receiving a stabilizer arm assembly 30 and includes a first anchor point 40 disposed proximate the top 45 of the base member 20 and a stop 50 disposed proximate the lower end 55 of the base member 20. As will be described in greater detail below, stop 50 is preferably defined by a clevis 51. In one embodiment, the stabilizer arm assembly 30 is nested within and received by the base member 20.

The stabilizer arm assembly 30 includes a piston 60 for actuating the stabilizer arm assembly 30, an outrigger arm member 65, a sliding arm member 70 nested within the outrigger arm member 65 so as to limit movement of the outrigger arm member 65 with respect to the sliding arm member 70 to rotational movement about a first pivot point 75 proximate the lower end 80 of the outrigger arm member 65 and a first locking mechanism for preventing rotational movement of the outrigger arm member 65. The first pivot point 75 is defined by registering hole members 76 disposed in side walls 92 of the outrigger arm member 65 proximate lower end 80, and registering hole members 77 disposed in the side walls 97 of the sliding arm member 70 proximate the lower end 78 of sliding arm member 70. Hole members 76 and hole members 77 are in register. A pin 91 provided at the first pivot point 75 is received by the clevis 51 and engages the stop 50 to limit the upward range of axial movement of the stabilizer arm assembly 30 within the base member 20. Moreover, clevis 51 serves to prevent the sliding arm member 70 from torquing within the channel 25 when the outrigger arm member 65 is deployed in the fold down stabilizer mode. The piston 60 has a first end 61 secured to the first anchor point 40 and a second end 62 secured to a second anchor point 42 provided on the outrigger arm member 65.

Figure 6:
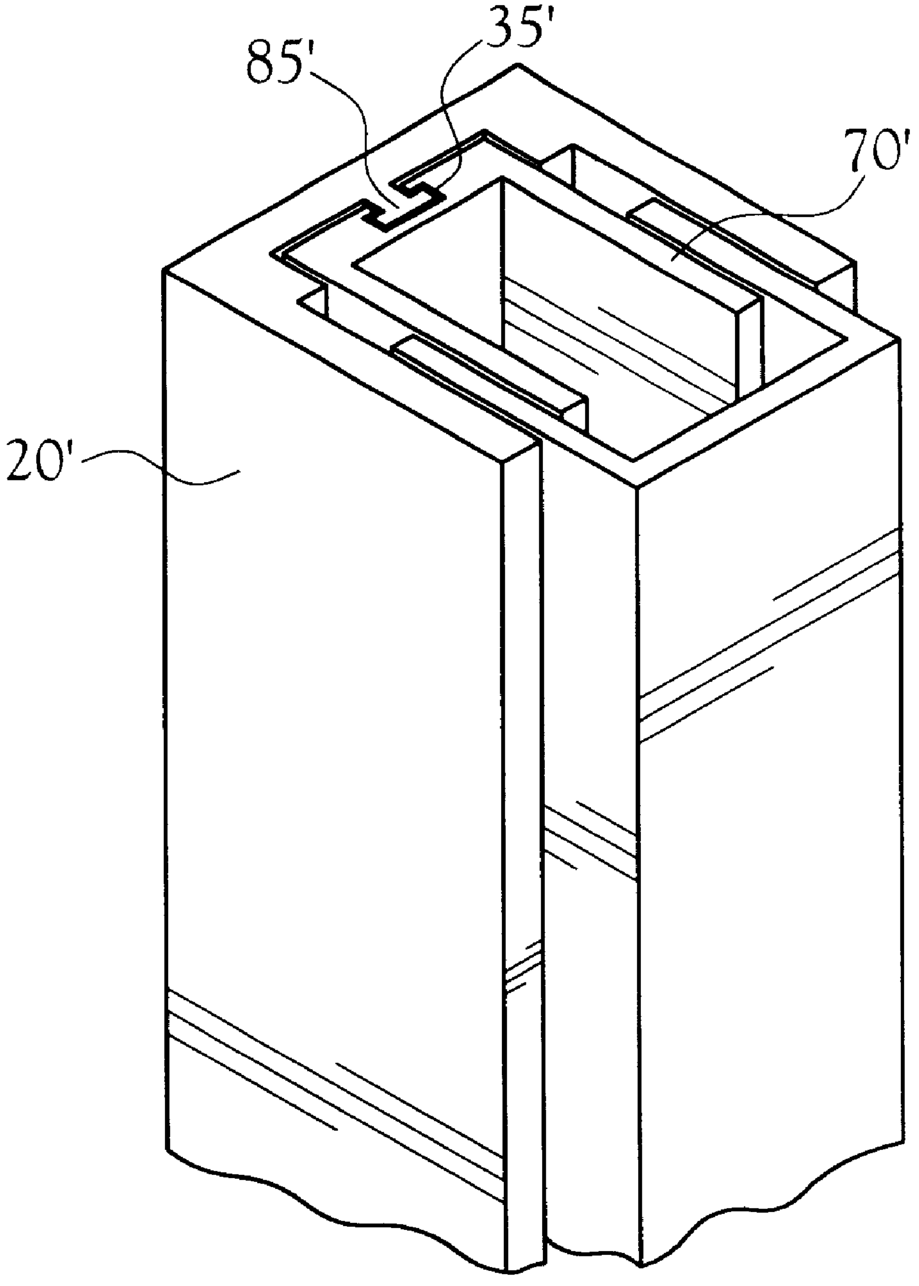
FIG. 6 illustrates an alternate arrangement of the key and keyway illustrated in FIG. 2.

A mechanism is provided to limit movement of the sliding arm member 70 relative to the base member 20 to axial movement. In one embodiment, the mechanism is defined by a guide slot or keyway 35 provided in the base member 20 and a key 85 disposed on the sliding arm member 70 that is received by the keyway 35. The particular configuration of the mechanism is adaptable so long as it limits the relative motion of the sliding arm 70 with respect to the base member 20 to axial motion. While a particular embodiment of the key 85 and keyway 35 has been illustrated, those skilled in the art will appreciate that other configurations of keys and keyways could be utilized in order to limit movement of the sliding arm member 70 within the base member 20 to axial movement. For instance, as seen in FIG. 6, the key 85' could be disposed on the base member 20' with the keyway 35' disposed on the sliding arm member 70'. A second locking mechanism is provided between the base member 20 and the sliding arm member 70 to prevent axial movement of the sliding arm member 70 within the base member 20.

Actuation of the piston 60 with the first locking mechanism engaged, preventing rotational movement of the outrigger arm member 65, and the second locking mechanism released causes the stabilizer arm assembly 30 to travel downwardly within base member 20 thus providing operation in the vertical stabilizer mode. Contrariwise, actuation of the piston 60 with the first locking mechanism released and the second locking mechanism engaged, preventing axial movement of the sliding arm member 70, causes the outrigger arm member 65 to rotate about the first pivot point75 thereby resulting in operation in the fold down stabilizer mode. Those skilled in the art will recognize that piston 60 is preferably a hydraulic ram. However, it is recognized that other actuators could be utilized such as, a pneumatic ram or a mechanically driven actuator.

Figure 1A:
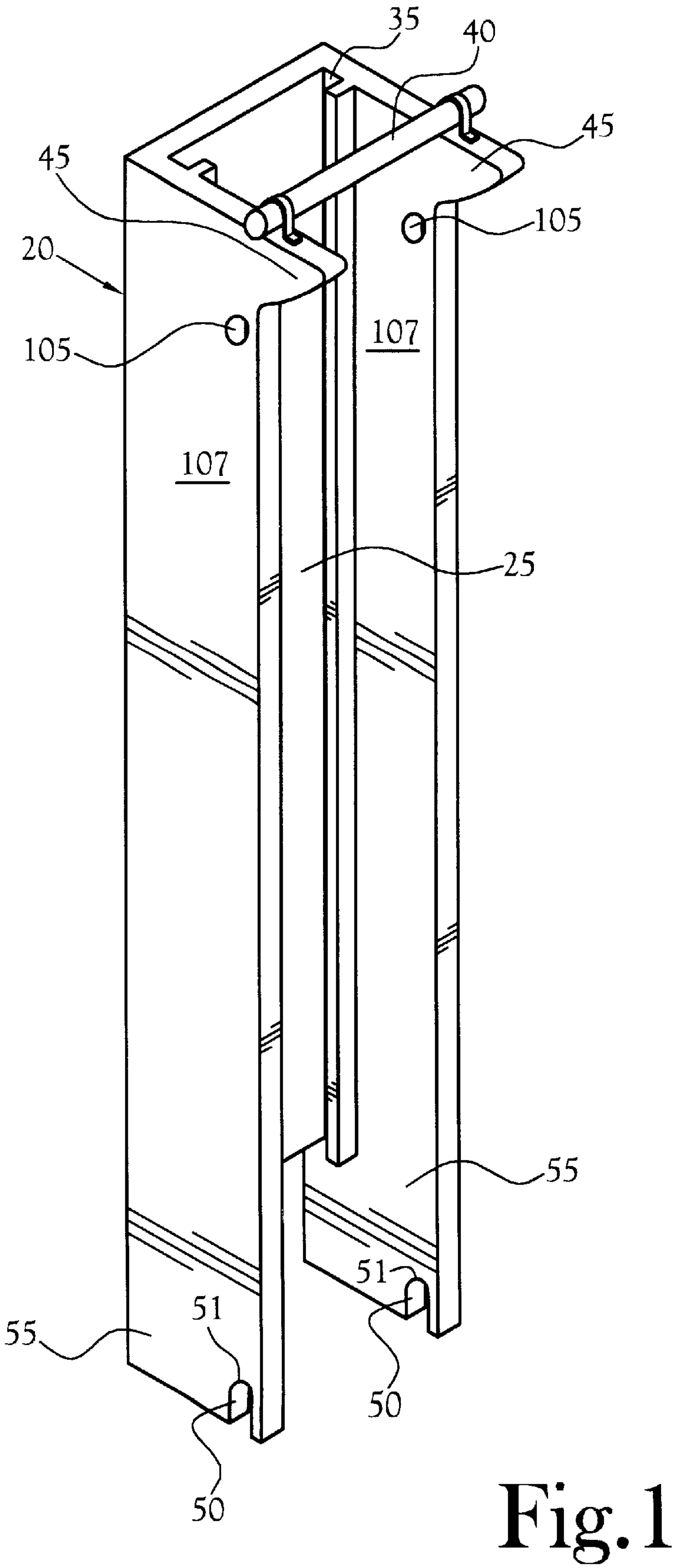
FIG. 1A illustrates a perspective view of the base member of the dual mode stabilizer of the present invention.
Figure 1B:
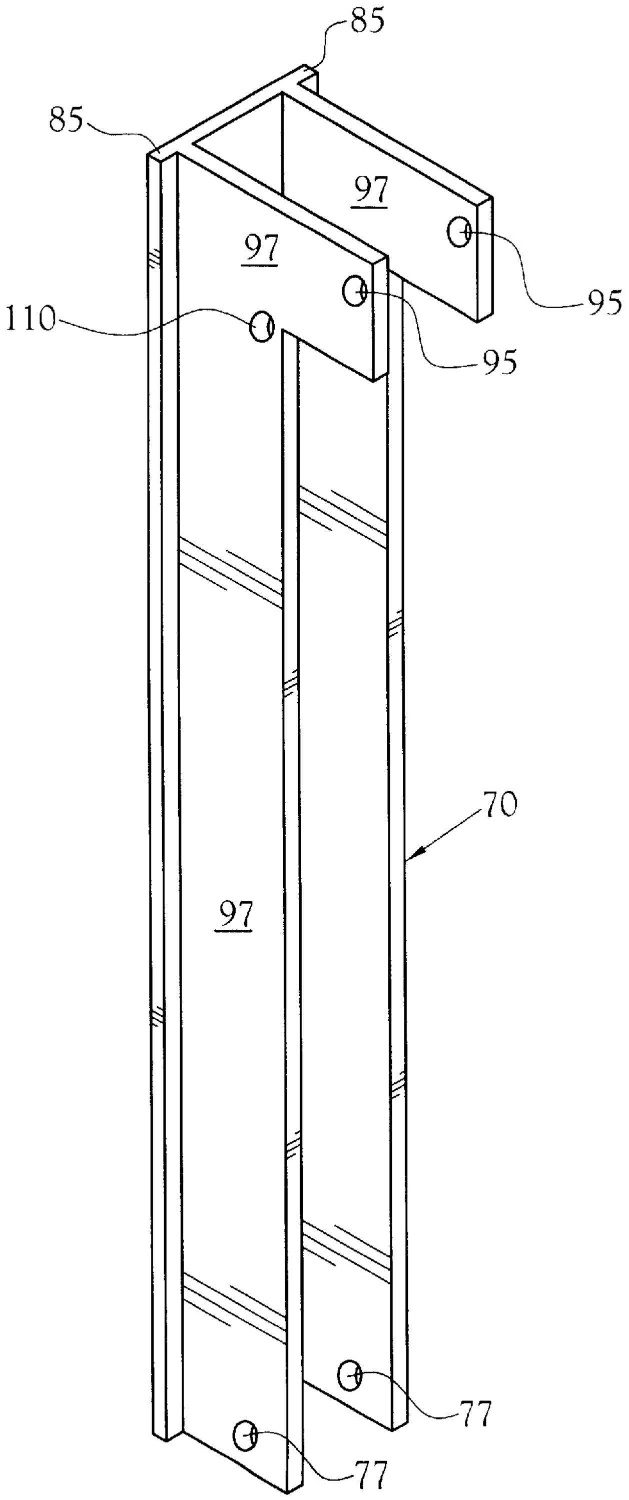
FIG. 1B illustrates a perspective view of the sliding arm member of the dual mode stabilizer of the present invention.
Figure 1C:
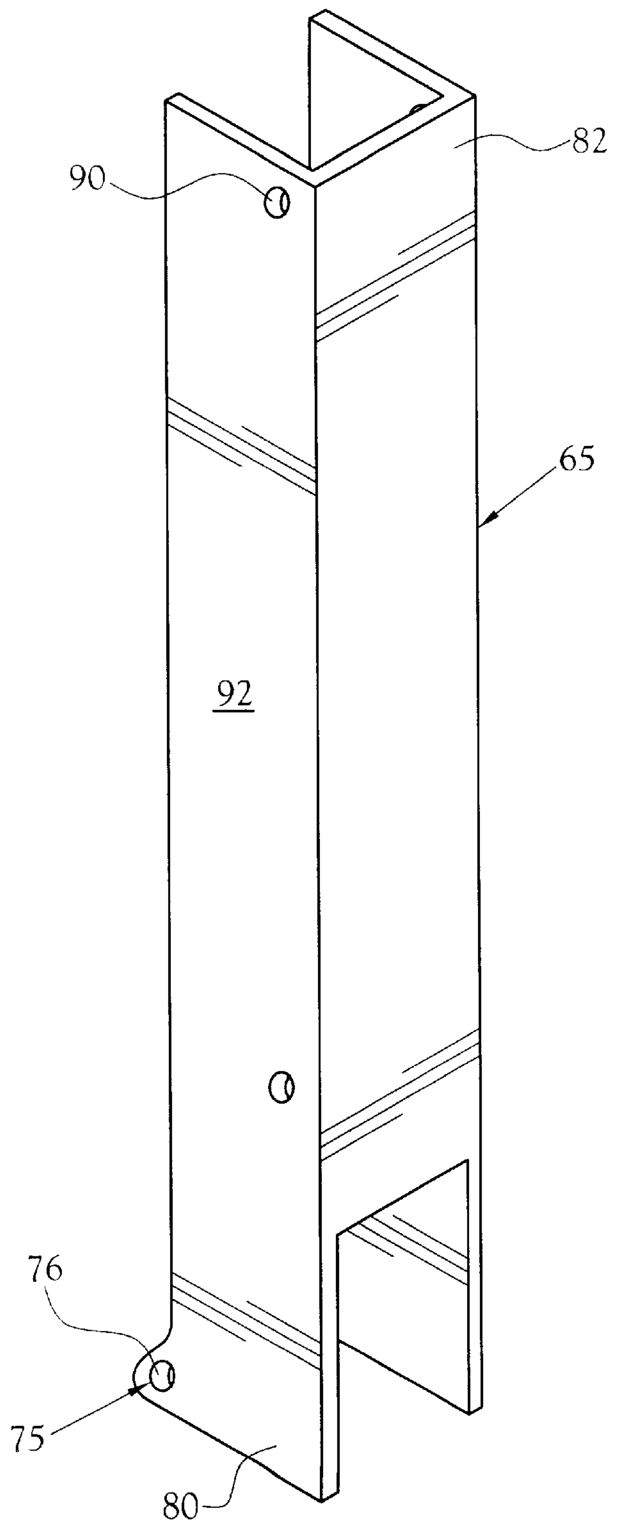
FIG. 1C illustrates a perspective view of the outrigger member of the dual mode stabilizer of the present invention.
Figure 2:
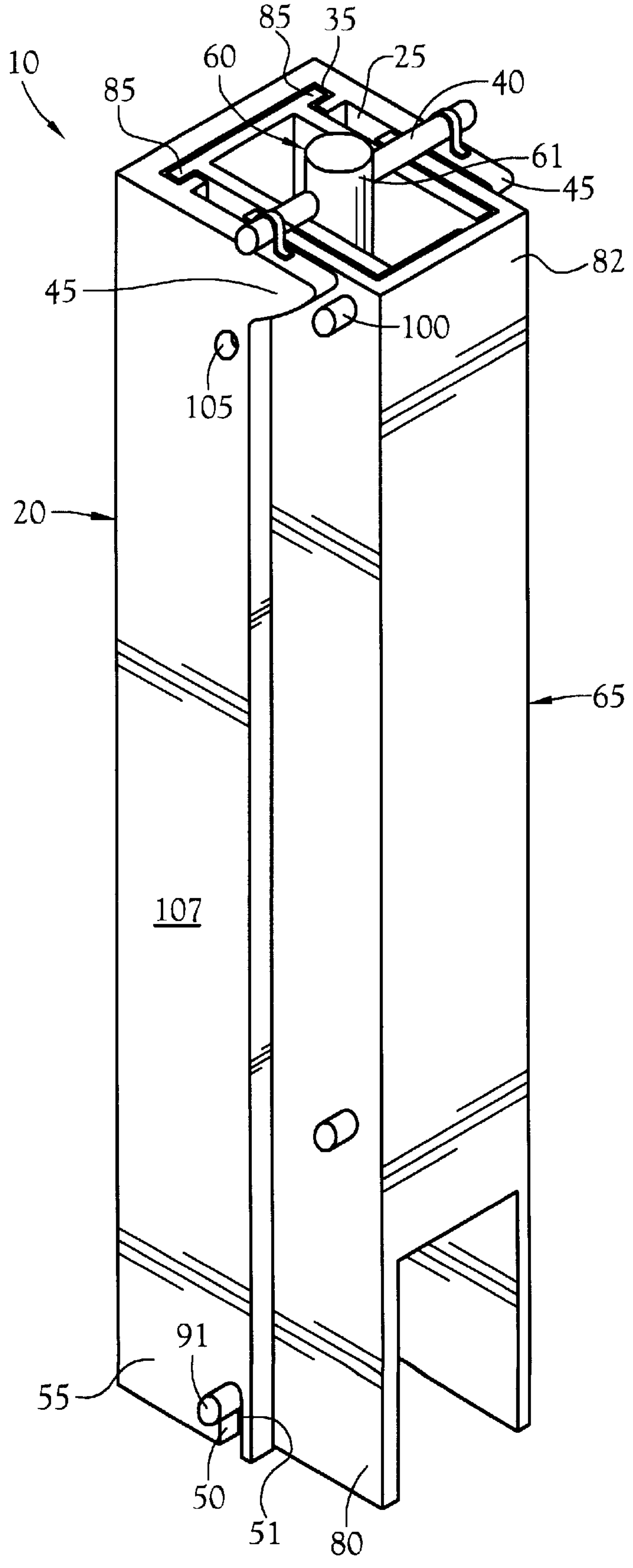
FIG. 2 illustrates a perspective view of the base member, sliding arm member and outrigger member of the dual mode stabilizer of the present invention nested together.
Figure 3:
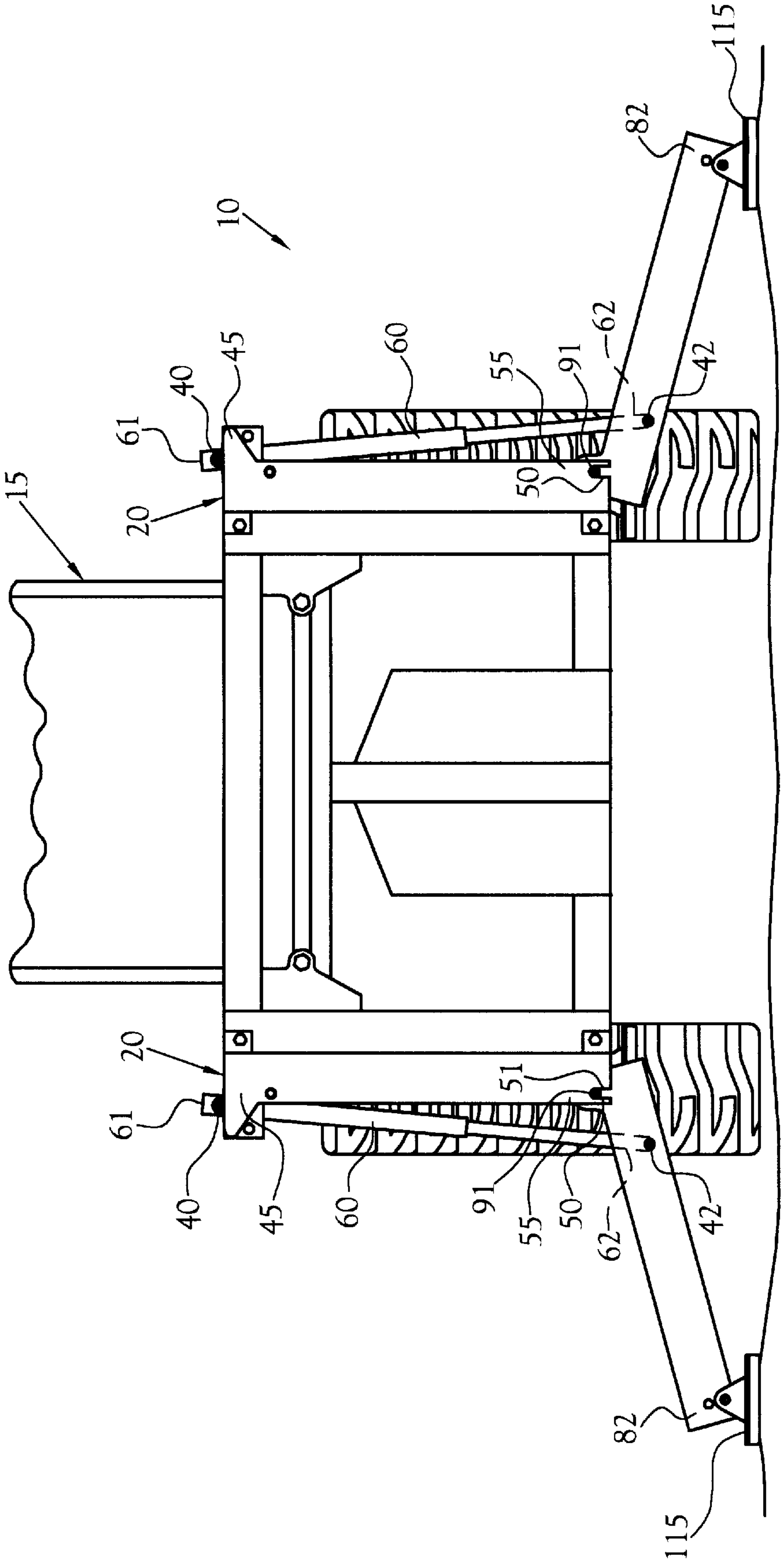
FIG. 3 illustrates an end elevation view of the dual mode stabilizer mounted on a tractor and operating in the fold down stabilizer mode.
Figure 4:
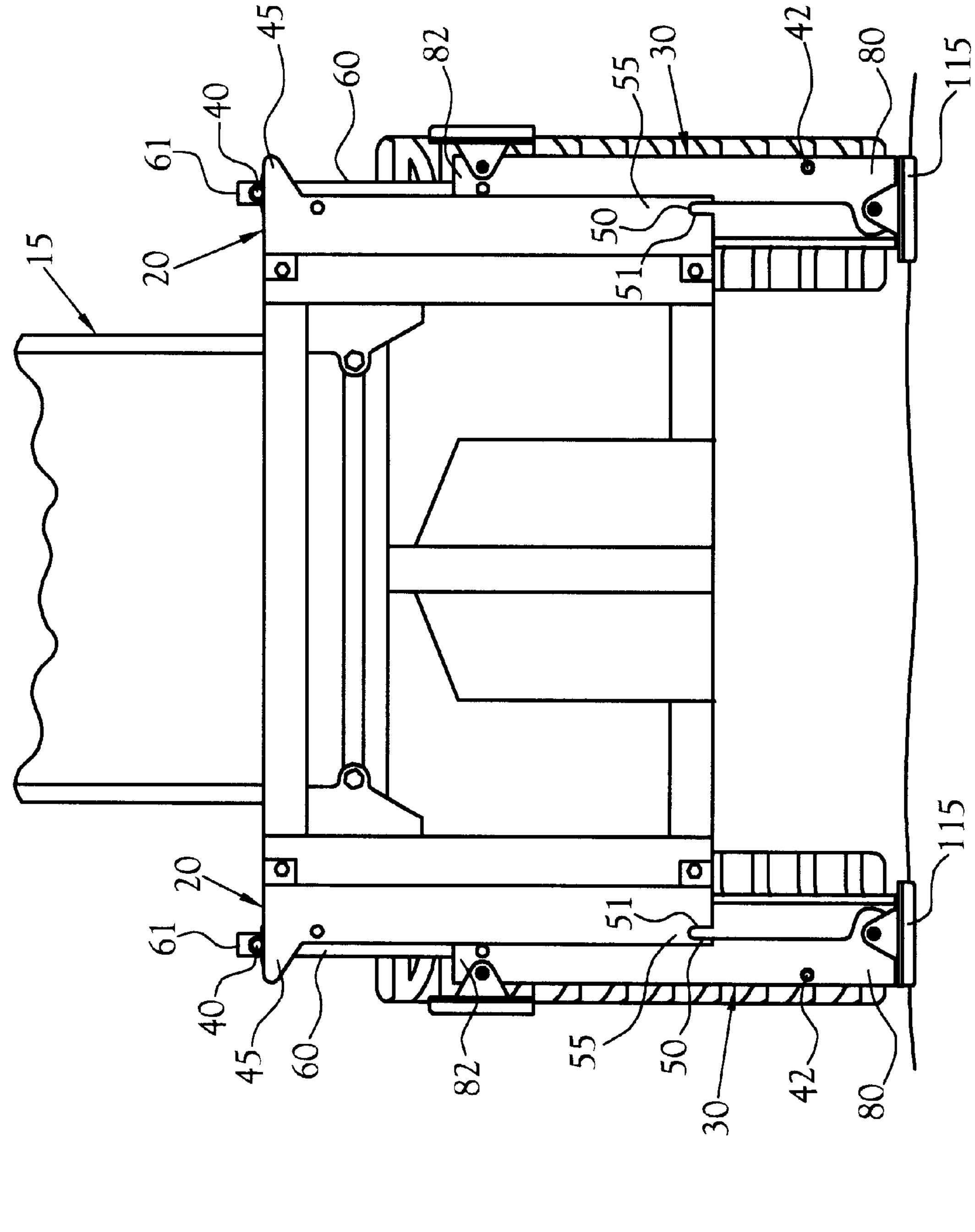
FIG. 4 illustrates an end elevation view of the dual mode stabilizer mounted on a tractor and operating in the vertical stabilizer mode.

Referring to FIGS. 1*a*–1*c*, the first and second locking mechanisms will be described. The first locking mechanism is defined by a first pair of registering hole members 90 provided in side walls 92 of the outrigger arm member 65 and a second pair of registering hole members 95 provided in the side walls 97 of the sliding arm member 70, the second pair of hole members 95 being in register with the first pair of hole members 90. In order to engage the first locking mechanism and lock the outrigger arm member 65 and the sliding arm member 70 together so as to prevent rotational movement of the outrigger arm member 65, a lynch pin 100 is inserted through the first and second pairs of registering hole members 90 and 95 respectively. FIG. 2 illustrates engagement of the first locking mechanism.

Figure 5:
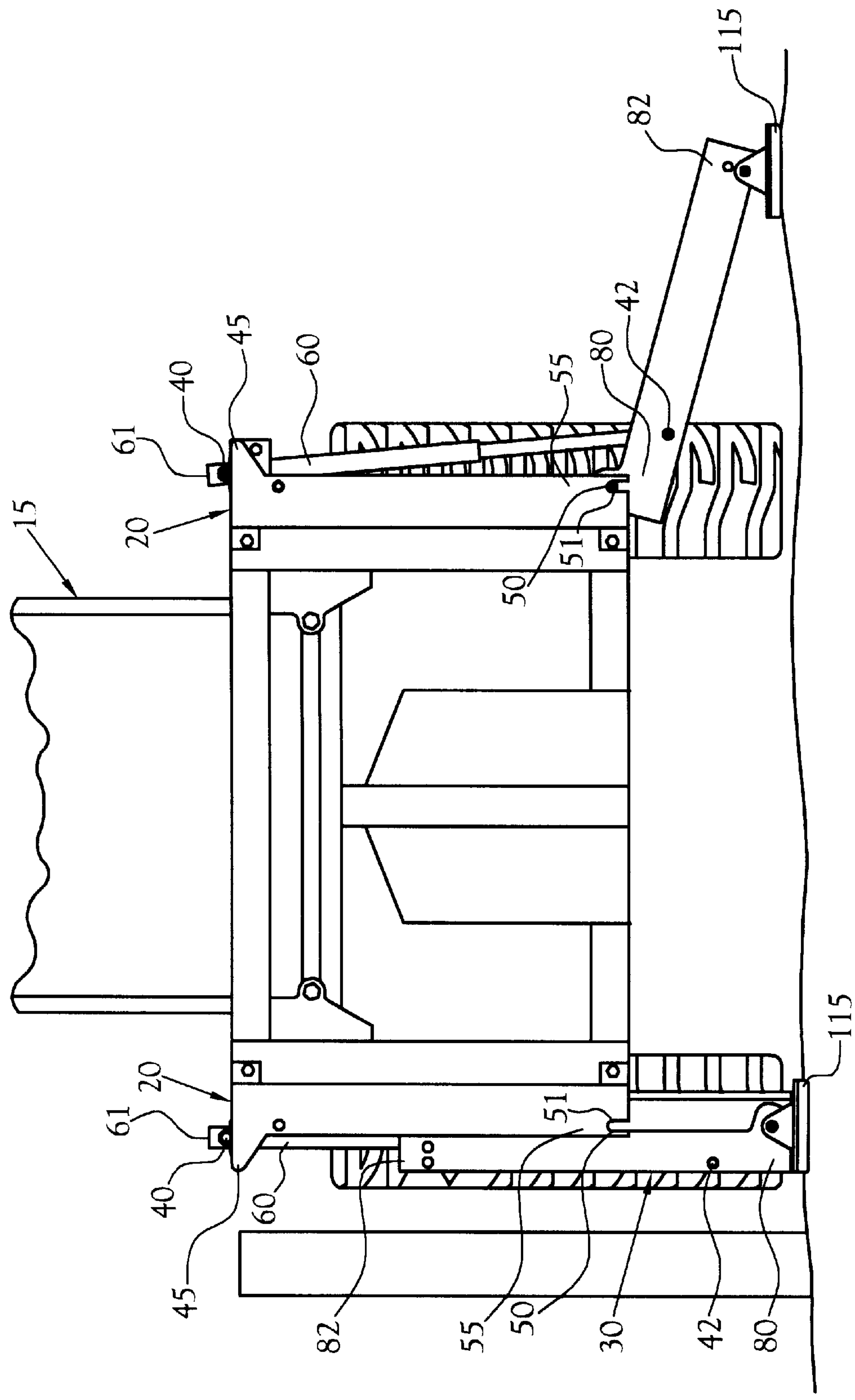
FIG. 5 illustrates an end elevation view of the dual mode stabilizer mounted on a tractor showing one stabilizer operating in the fold down stabilizer mode and the other stabilizer operating in the vertical stabilizer mode.

The second locking mechanism works in similar fashion and prevents axial movement of the sliding arm member 70 within the base member 20. The second locking mechanism is defined by a first pair of registering hole members 105 provided in side walls 107 of the base member 20 and a second pair of registering hole members 110 provided in the side walls 97 of the sliding arm member 70, the second pair of hole members 110 being in register with the first pair of hole members 105 disposed on the side walls 107 of the base member 20. In order to engage the second locking mechanism and lock the base member 20 and the sliding arm member 70 together so as to prevent axial movement of the sliding arm member 70 within the base member 20, the lynch pin 100 is inserted into the first and second pairs of registering hole members 105 and 110. It is anticipated that a single lynch pin 100 could be utilized in order to selectively switch between the fold-down stabilizer mode and the vertical stabilizer mode. Those skilled in the art will recognize that the first and second locking mechanisms could be engaged with a fastening mechanism other than a lynch pin. Further, in one embodiment, foot pads, such as foot pads 115 are pivotally and removably mounted on the lower end 80 and upper end 82 of outrigger arm member 65. Those skilled in the art will recognize that, as seen in FIG. 5, each side of the dual mode stabilizer 10 could be independently operated such that one side of dual mode stabilizer 10 could be operated in the vertical stabilizer mode and the other side of the dual mode stabilizer 10 could be operated in the fold-down stabilizer mode.

Referring to FIGS. 7A–11, an alternate embodiment is illustrated with common components bearing the same reference numerals. Comparable but distinctive parts bear the same reference numeral with the prime notation added, and parts not previously described bear their own reference numerals. In this regard, in the alternate embodiment of the dual mode stabilizer 10', each base member 20' defines a channel 25' for receiving a stabilizer arm assembly 30' and includes tabs 135, a first anchor point 40' disposed proximate the top 45' of the base member 20' and a stop 50 disposed proximate the lower end 55' of the base member 20'. A portion of the top 45' of the base member 20' is enclosed by a wall member 145, which is illustrated as being integral with base member 20'. However, those skilled in the art will recognize that wall member 145 can be fixed to the upper end the top 45' of the base member 20' by means of fasteners (not shown).

The stabilizer arm assembly 30' includes an actuator, such as piston 60, for actuating the stabilizer arm assembly 30', an outrigger arm member 65', and a cooperating sliding arm member 70' pivotally connected to the outrigger arm member 65' so as to limit movement of the outrigger arm member 65' with respect to the sliding arm member 70' to rotational movement about a first pivot point 75' proximate the lower end 80' of the outrigger arm member 65' and a first locking mechanism for preventing rotational movement of the outrigger arm member 65'. The first pivot point 75' is defined by a pin receptor 140 disposed on the lower end 80' of the outrigger arm member 65', and registering hole members 77' disposed in the side walls 97' of the sliding arm member 70' proximate the lower end 180 of sliding arm member 70'. Pin receptor 140 registers with hole members 77'. A pin 91 provided at the first pivot point 75' engages the stop 50 to limit the upward range of axial movement of the stabilizer arm assembly 30' within the base member 20'. The piston 60 has a first end 61 secured to the first anchor point 40' and a second end 62 secured to a second anchor point 42' provided on the outrigger arm member 65'.

The sliding arm member 70' engages tabs 135 so as to limit movement of the sliding arm member 70' within the base member 20' to axial movement. Those skilled in the art will recognize that while tabs 135 are described in conjunction with this embodiment, an arrangement as described above using cooperating keys and keyways could also be utilized. As stated above, the particular configuration is adaptable so long as movement of sliding arm 70' relative to base member 20' is limited to axial movement. A second locking mechanism is provided between the base member 20' and the sliding arm member 70' to prevent axial movement of the sliding arm member 70' within the base member 20'. Further, the side walls 97' of the sliding arm member 70' are provided with cutouts 172 to provide clearance for the first anchor point 40' of piston 60 when sliding arm 70' is at the upward limit of its range of axial motion.

As discussed above, actuation of the piston 60 with the first locking mechanism engaged and the second locking mechanism released causes the stabilizer arm assembly 30' to travel downwardly within base member 30' thus providing operation in the vertical stabilizer mode. Contrariwise, actuation of the piston 60 with the first locking mechanism released and the second locking mechanism engaged, causes the outrigger arm member 65' to rotate about the first pivot point75' thereby resulting in operation in the fold down stabilizer mode.

Figure 7A:
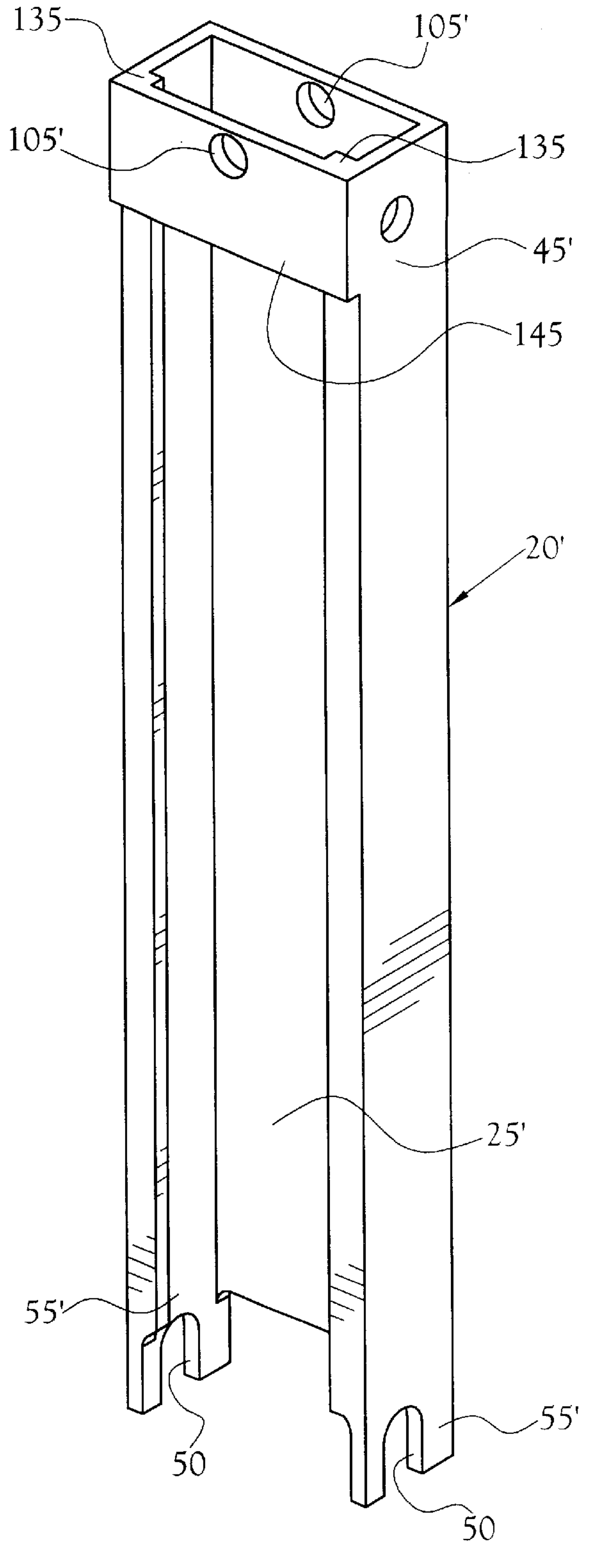
FIG. 7A illustrates a perspective view of the base member of an alternate embodiment dual mode stabilizer of the present invention.
Figure 7B:
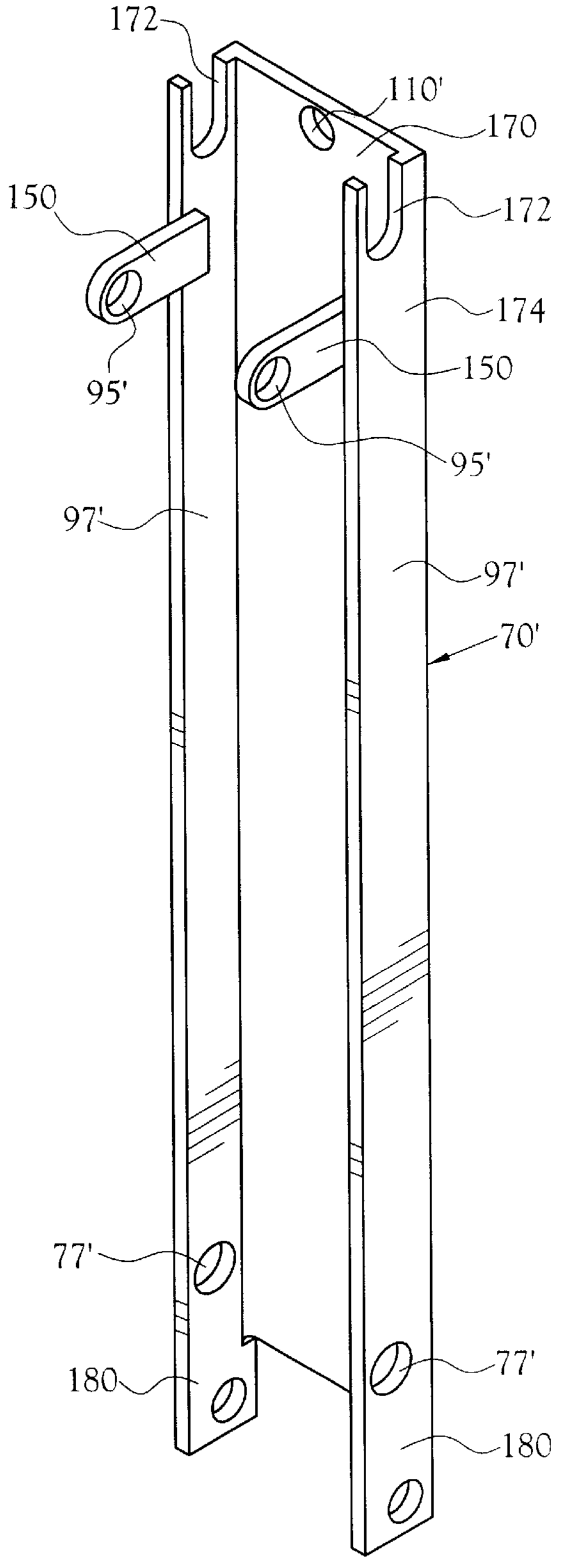
FIG. 7B illustrates a perspective view of an alternate embodiment dual mode stabilizer of the present invention.
Figure 7C:
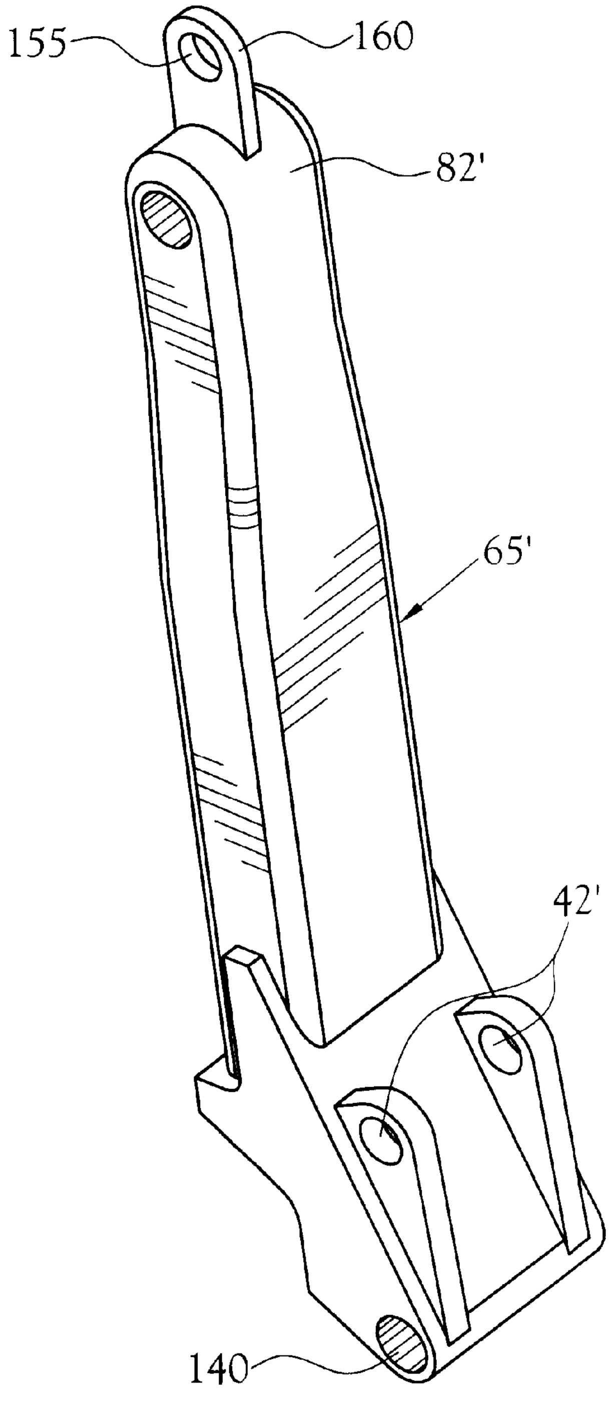
FIG. 7C illustrates a perspective view of the outrigger member of an alternate embodiment dual mode stabilizer of the present invention.
Figure 8:
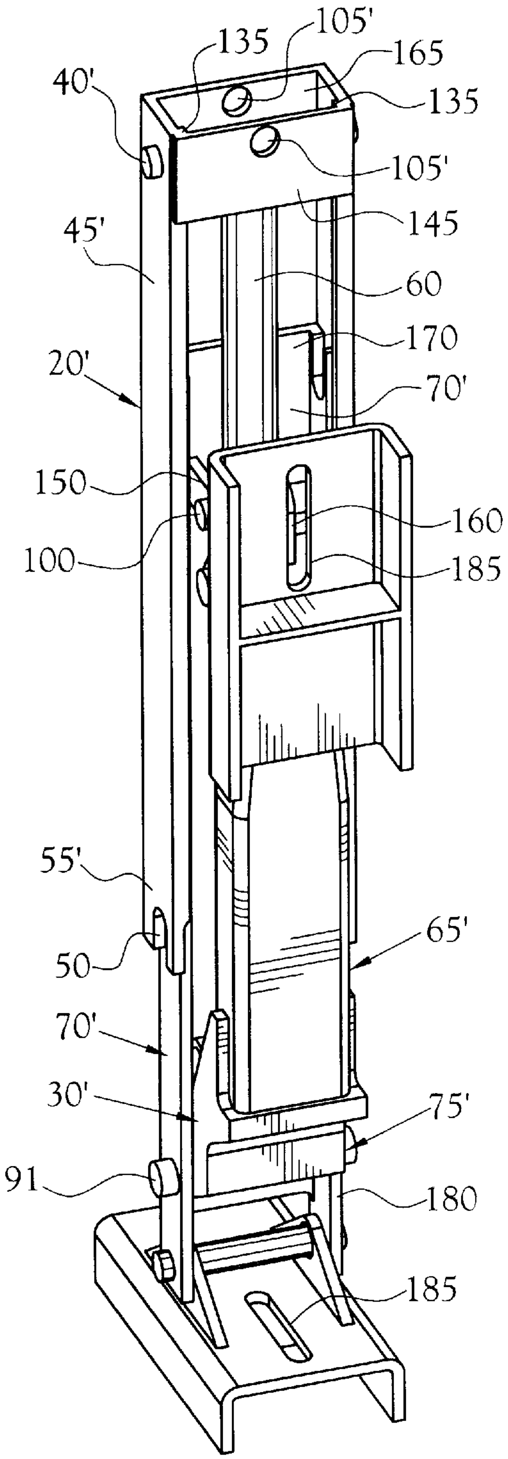
FIG. 8 illustrates a perspective view of an alternate embodiment dual mode stabilizer operating in the vertical stabilizer mode.

Referring to FIGS. 7A–7C, the preferred embodiments of the first and second locking mechanisms will be described. The first locking mechanism is defined by a first pair of registering hole members 95' provided in tabs 150 disposed proximate the upper end of the sliding arm member 70' and a registering hole member 155 provided on a tab 160 disposed at the upper end 82' the outrigger arm member 65'. In order to engage the first locking mechanism and lock the outrigger arm member 65' and the sliding arm member 70' together so as to prevent rotational movement of the outrigger arm member 65', a lynch pin 100 is inserted through registering hole members 95' and 155, respectively. FIG. 8 illustrates engagement of the first locking mechanism.

Figure 9:
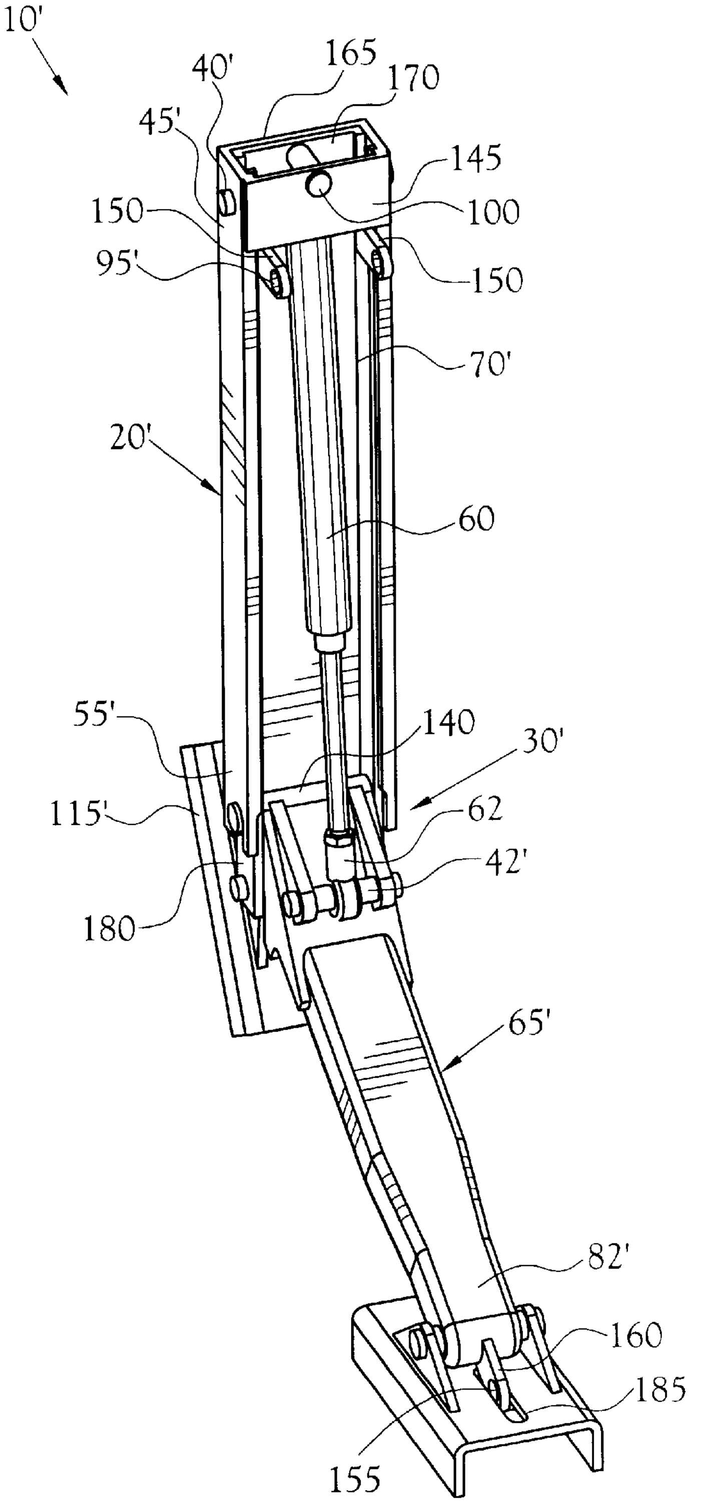
FIG. 9 illustrates a perspective view of the embodiment illustrated in FIG. 8 operating in the fold down stabilizer mode.
Figure 10:
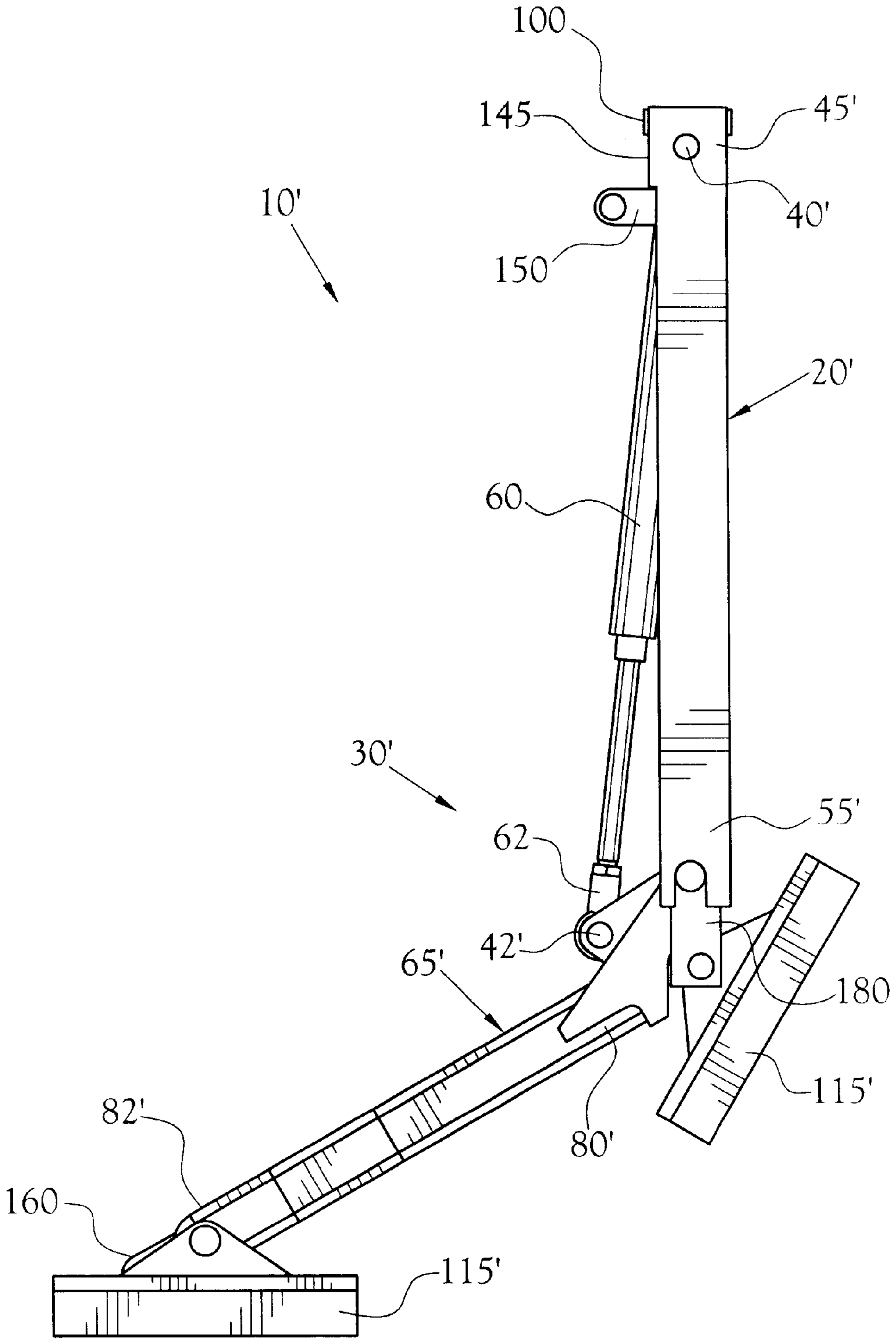
FIG. 10 illustrates an end elevational view of the embodiment illustrated in FIG. 8 operating in the fold down stabilizer mode.

The second locking mechanism works in similar fashion and prevents axial movement of the sliding arm member 70' within the base member 20'. The second locking mechanism is defined by a first pair of registering hole members 105' provided in wall member 145 and rear wall 165 of the base member 20' and a hole member 110' provided in the rear wall 170 of the sliding arm member 70', hole members 110' being in register with the first pair of hole members 105' disposed on the base member 20'. In order to engage the second locking mechanism and lock the base member 20' and the sliding arm member 70' together so as to prevent axial movement of the sliding arm member 70' within the base member 20', the lynch pin 100 is inserted through registering hole members 105' and 110'. FIGS. 9 and 10 illustrate engagement of the second locking mechanism.

It is anticipated that a single lynch pin 100 could be utilized in order to selectively switch between the fold-down stabilizer mode and the vertical stabilizer mode. Further, a first foot pad 115' is pivotally and, preferably, removably mounted on the lower end 180 of sliding arm member 70'. Those skilled in the art will recognize that the footpad mounted to the lower end 180 of sliding arm 70' could be fixed, i.e. welded or fastened with other fasteners. A second foot pad 115' is pivotally and, preferably, removably mounted on the upper end 82' of outrigger arm member 65'. In order to prevent tab 160 from impeding the pivotal movement of foot pad 115' when the dual mode stabilizer 10' is used in the fold-down stabilizer mode, a slot 185 is provided in foot pad 115'. Those skilled in the art will recognize that, as seen in FIG. 5, each side of the dual mode stabilizer 10 could be independently operated such that one side of dual mode stabilizer 10 could be operated in the vertical stabilizer mode and the other side of the dual mode stabilizer 10 could be operated in the fold-down stabilizer mode.

Referring to FIGS. 12–16, an embodiment configured for mounting on a state of the art rubber-tire backhoe loader is illustrated with common components bearing the same reference numerals. Comparable but distinctive parts bear the same reference numeral with the double prime notation added, and parts not previously described bear their own reference numerals. In this regard, as described above, the rubber-tire backhoe loader embodiment of the dual mode stabilizer 10", includes a base member 20", a stabilizer arm assembly 30", a first anchor point 40' disposed proximate the top 45" of the base member 20" and a stop 50 disposed proximate the lower end 55" of the base member 20". A portion of the top 45' of the base member 20' is enclosed by a wall member 145', which is illustrated as being integral with base member 20". However, as discussed above, those skilled in the art will recognize that wall member 145' can be fixed to the upper end the top 45" of the base member 20" by means of fasteners (not shown), or by any other standard means.

The stabilizer arm assembly 30" includes an actuator, such as piston 60, for actuating the stabilizer arm assembly 30", an outrigger arm member 65", and a cooperating sliding arm member 70" pivotally connected to the outrigger arm member 65" so as to limit movement of the outrigger arm member 65" with respect to the sliding arm member 70" to rotational movement about a first pivot point 75' proximate the lower end 80" of the outrigger arm member 65" and a first locking mechanism for preventing rotational movement of the outrigger arm member 65". As described more fully above, a pin 91', provided at the first pivot point 75', engages the stop 50 to limit the upward range of axial movement of the stabilizer arm assembly 30" within the base member 20". The piston 60, as described above, is secured to the first anchor point 40' and to a second anchor point 42' provided on the outrigger arm member 65".

The stop 50 is defined by a clevis 51 that receives the pin 91. In the most preferred embodiment, a bushing 250, engaged with the pin 91, engages the clevis 51 so as to distribute the pressure at the point of contact over a greater surface area. Additionally, a brace 240 is provided to reinforce clevis 51 and the lower end of the base member proximate the clevis 51.

Additionally, a mounting member 235 is carried by the base member 20" and is adapted for mounting the dual mode stabilizer 10" to a rubber-tire backhoe loader. Further, at least one grease fitting 230 is provided in order to supply a lubricant, such as grease, to the channel thereby preventing excess friction between sliding arm member 70" and base member 20".

Figure 22:
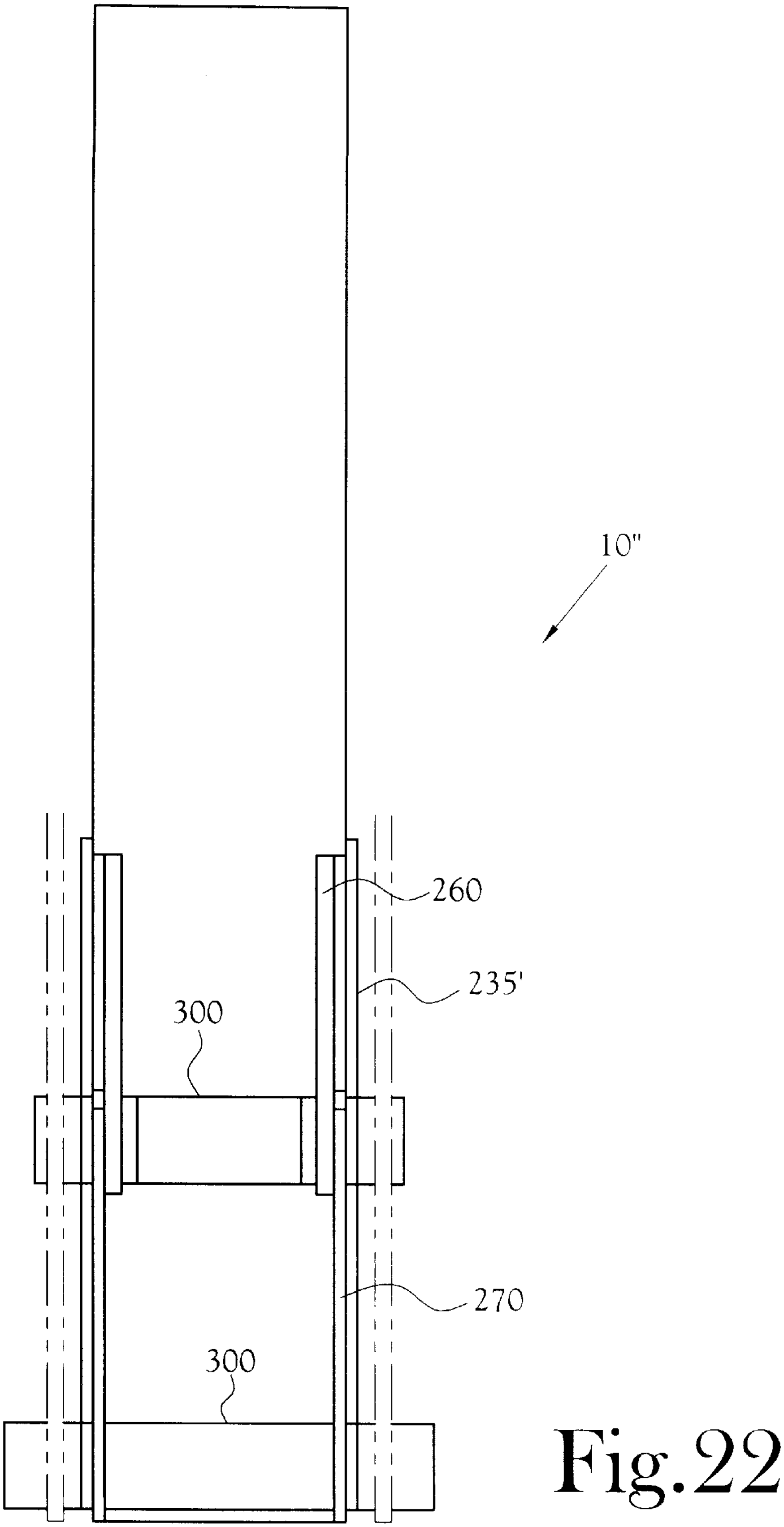
FIG. 22 illustrates a partial rear elevation view of the embodiment illustrated in FIG. 17 showing the adjustable mounting brackets.

Referring to FIGS. 17 through 22, an alternate mounting member 235', having adjustable mounting brackets, is illustrated. In this regard, it will be appreciated by those skilled in the art that different makes and models of rubber-tired backhoe loaders have differently configured mounting areas for mounting a state of the art outrigger and hydraulic piston. Further, it will be appreciated that there are wide tolerances within the spacing of mounting holes (not shown) within a given make and model of tractors. Accordingly, in order to compensate for this, mounting member 235' includes adjustable mounting brackets defined by upper mounting brackets 260 and lower mounting brackets 270. Mounting member 235' includes a plurality of hole members 275 for engaging registering hole members disposed in lower mounting brackets 270. Fasteners 280, such as bolts and associated nuts, are used to secure lower mounting bracket 270 to mounting member 235'. Similarly, upper mounting bracket 260 is secured to mounting member 235' by fasteners 285 which pass through hole members 290 provided in mounting member 235'. In order to accommodate for variances in dimensional tolerances within a given make and model of tractor, hole members 290 are preferably elliptical. It will be appreciated, as shown in FIG. 22, that a pair of upper mounting brackets 260 and lower mounting brackets 270 are used for mounting a dual-mode stabilizer 10" to each side of a tractor. In order to provide additional strength, a spacer 300 is inserted between each pair of upper and lower mounting brackets 260 and 270.

Figure 14:
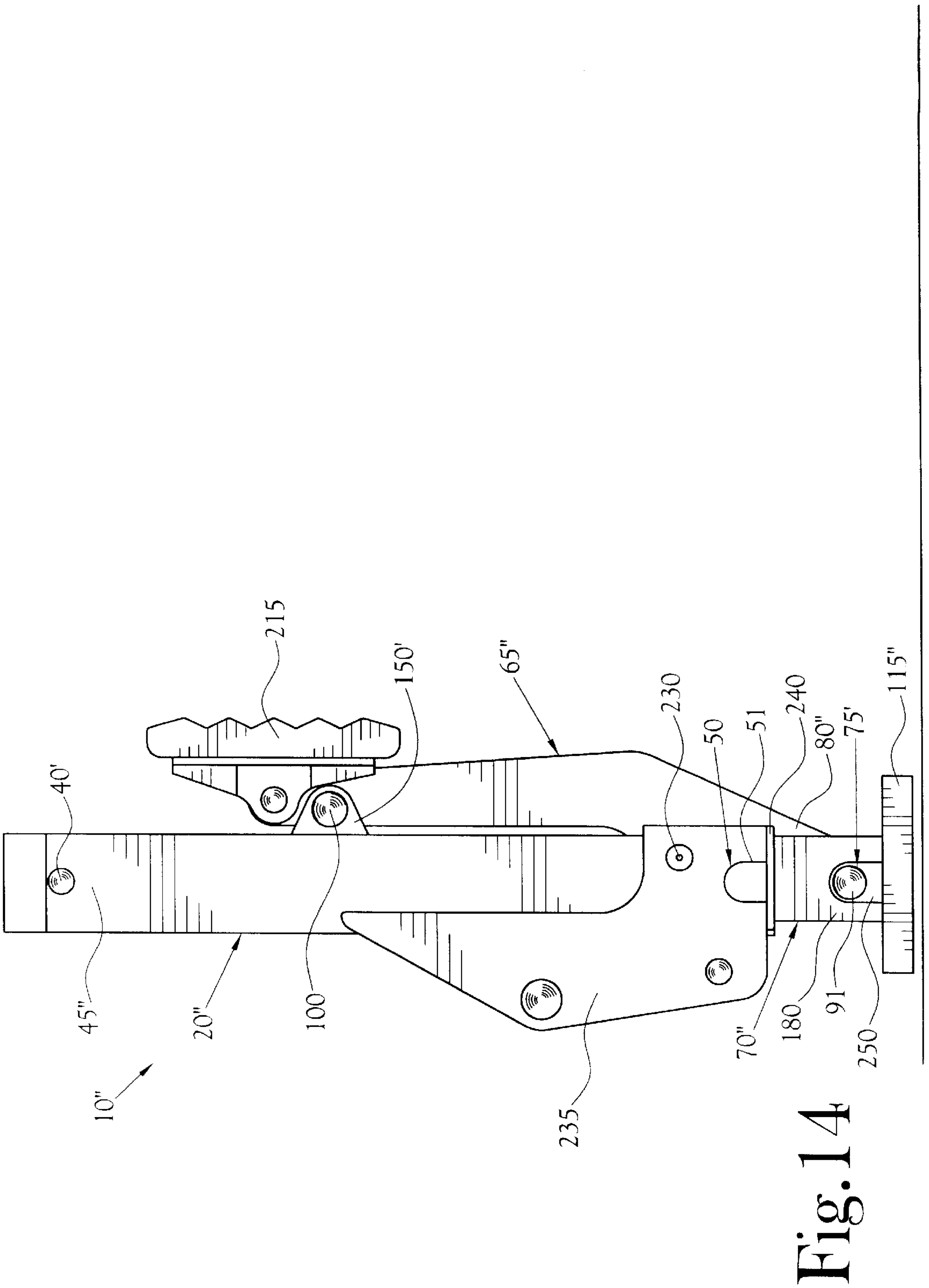
FIG. 14 illustrates a side elevation view of the embodiment shown in FIG. 12 operating in the vertical stabilizer mode.

The first locking mechanism is defined by a first pair of registering hole members 95" provided in tabs 150' disposed proximate the upper end of the sliding arm member 70" and a registering hole member 155' provided at the upper end 82" the outrigger arm member 65". In order to engage the first locking mechanism and lock the outrigger arm member 65" and the sliding arm member 70" together so as to prevent rotational movement of the outrigger arm member 65", a lynch pin 100 is inserted through registering hole members 95" and 155', respectively. FIG. 14 illustrates engagement of the first locking mechanism.

As can be seen in FIGS. 17 through 22, the dual mode stabilizer 10" can be configured with only one tab 150' per stabilizer. In this regard, it has been determined that one tab 150' is sufficient to secure the first locking mechanism. Moreover, by placing tab 150' on the forwardmost side, i.e. the side towards the front of the tractor 15, the backhoe boom arm, (not shown) has a greater range of side-to-side motion, i.e. its range of motion is not restricted by the presence of tab 150'.

Figure 12:
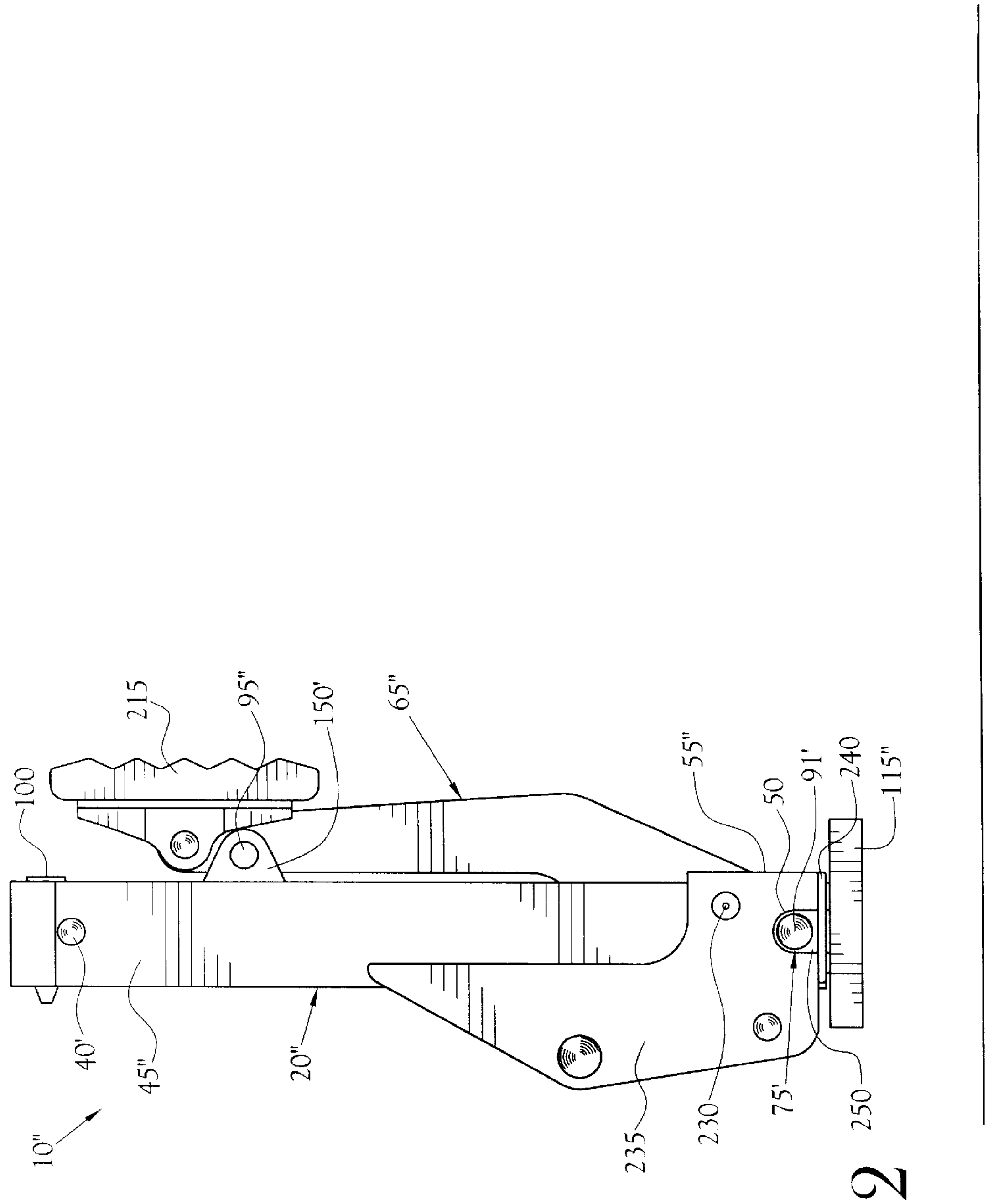
FIG. 12 illustrates a side elevation view of a second alternate embodiment of the dual mode stabilizer configured for mounting on a state of the art rubber-tire backhoe loader.
Figure 13:
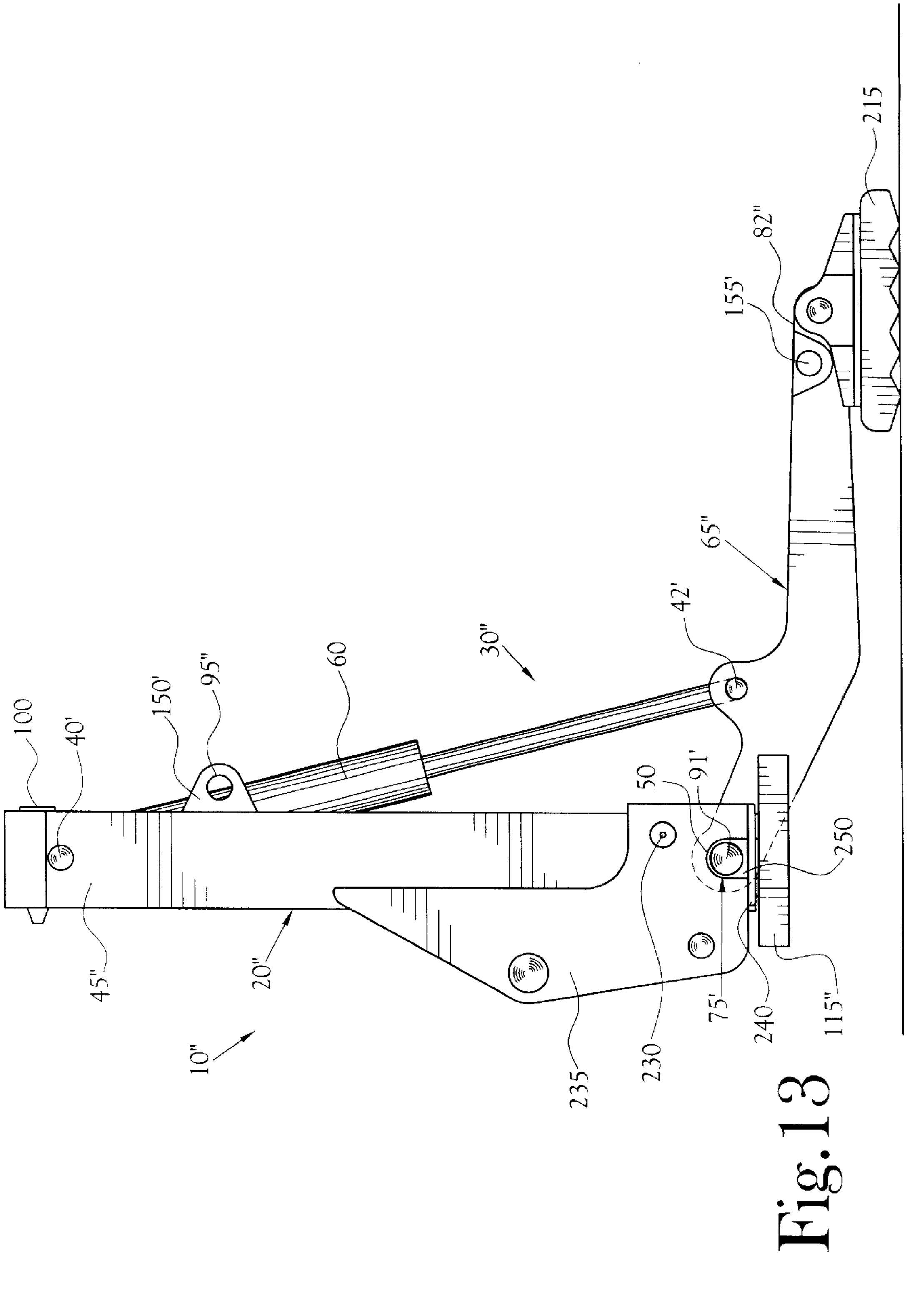
FIG. 13 illustrates a side elevation view of the embodiment shown in FIG. 12 operating in the fold down stabilizer mode.

The second locking mechanism works in similar fashion and prevents axial movement of the sliding arm member 70" within the base member 20". As described above, the second locking mechanism is defined by a hole member provided in wall member 145' and a registering hole member provided in the rear wall of the base member 20". A further hole member provided in the rear wall of the sliding arm member 70" is adapted to register with the hole members disposed on the base member 20". In order to engage the second locking mechanism and lock the base member 20" and the sliding arm member 70" together so as to prevent axial movement of the sliding arm member 70" within the base member 20", the lynch pin 100 is inserted through registering hole members disposed in the wall members of the base member 20". FIGS. 12 and 13 illustrate engagement of the second locking mechanism.

A first foot pad 115" is, preferably, removably mounted on the lower end 180' of sliding arm member 70". Those skilled in the art will recognize that the footpad 115" mounted to the lower end 180' of sliding arm 70" could be fixed, i.e. welded or fastened with other fasteners. A second foot pad 215 is pivotally and, preferably, removably mounted on the upper end 82" of outrigger arm member 65".

From the foregoing description, it will be recognized by those skilled in the art that a dual mode stabilizer, operable in either a fold-down stabilizer mode or a vertical stabilizer mode, for a backhoe such as a backhoe attachment for a tractor offering advantages over the prior art has been provided. Specifically, the dual mode stabilizer provides operation in both a fold-down stabilizer mode or a vertical stabilizer mode utilizing a standard hydraulic system without requiring an additional hydraulic ram for each mode, and that is readily switchable from one mode to another simply by repositioning a lynch pin on each boom.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A dual mode stabilizer for a tractor, said dual mode stabilizer comprising:

at least one base member rigidly fixable proximate a side of the tractor, said at least one base member having an upper end and a lower end;

a clevis disposed proximate said lower end of said at least one base member, wherein said clevis defines a stop;

a stabilizer arm assembly engaged with said base member having an outrigger arm member and a sliding arm member, said outrigger arm member and said sliding arm member being pivotally connected together at a pivot point so as to allow rotational movement of said outrigger arm member relative to said sliding arm member, said pivot point being engageable with said stop so as to limit upward travel of said stabilizer arm assembly relative to said base member;

a mechanism in association with said base member and said sliding arm member for limiting movement of said sliding arm member relative to said base member to axial movement;

a first locking mechanism interconnecting said outrigger arm member and said sliding arm member for preventing rotational movement of said outrigger arm member around said pivot point;

a second locking mechanism interconnecting said base member and said sliding arm member for preventing axial movement of said sliding member relative to said base member;

a drive mechanism connected between said base member and said stabilizer arm assembly for actuating said stabilizer arm assembly whereby said dual mode stabilizer is selectively operable in a vertical stabilizer mode and a fold down stabilizer mode; and a mounting member carried by said base member and at least an upper and at least a lower mounting bracket secured to said mounting member, said mounting member and said upper and lower mounting brackets being adapted for securing said dual mode stabilizer to a rubber-tire backhoe loader.

2. The dual mode stabilizer of claim 1 wherein said dual mode stabilizer is mountable on a frame of the tractor.

3. The dual mode stabilizer of claim 1 wherein said dual mode stabilizer is mountable on a backhoe attachment.

4. The dual mode stabilizer of claim 1 wherein said first locking mechanism is defined by a first pair of hole members disposed in spaced relation and in register on opposite side walls of said outrigger arm member, a second pair of hole members disposed in spaced relation and in register on opposite side walls of said sliding arm member, and a lynch pin adapted to be received by said first and said second pair of hole members when said sliding member is positioned such that said second pair of hole members is in register with said first pair of hole members.

5. The dual mode stabilizer of claim 1 wherein said first locking mechanism is defined by a pair of hole members disposed in spaced relation and in register on first and second tabs in spaced relation disposed proximate an upper end of said sliding arm member and a hole member provided in a tab disposed on an upper end of said outrigger arm member, and a lynch pin adapted to be received by said registering hole members when said sliding arm member is positioned such that said pair of hole members associated with said sliding arm member is in register with said hole member associated with said outrigger arm member.

6. The dual mode stabilizer of claim 1 wherein said second locking mechanism is defined by a first pair of hole members disposed in spaced relation and in register on opposing walls of said base member, at least one hole member provided in a wall of said sliding arm member, and a lynch pin adapted to be received by said first pair of hole members and said at least one hole member when said sliding arm member is positioned such that said at least one hole member is in register with said first pair of hole members.

7. The dual mode stabilizer of claim 1 wherein said drive mechanism is defined by a piston.

8. The dual mode stabilizer of claim 7 wherein said piston is hydraulically driven.

9. The dual mode stabilizer of claim 1 wherein said dual mode stabilizer further comprises a brace disposed proximate said clevis for reinforcing said stop.

10. The dual mode stabilizer of claim 1 wherein said mounting member includes a first plurality of hole members are carried by said mounting member proximate said upper mounting bracket and a second plurality of hole members are carried by said mounting member proximate said lower mounting bracket and said upper and said lower mounting brackets are secured to said mounting member by fasteners engaged with said first and second plurality of hole members carried by said mounting member.

11. The dual mode stabilizer of claim 10 wherein said first plurality of hole members carried by said mounting member are elliptical.

* * * * *